US012684553B2

(12) United States Patent
Hao et al.

(10) Patent No.: US 12,684,553 B2
(45) Date of Patent: Jul. 14, 2026

(54) METHOD AND SYSTEM OF FEEDBACK FOR GROUP COMMON TRANSMISSION

(71) Applicant: ZTE CORPORATION, Shenzhen (CN)

(72) Inventors: Peng Hao, Shenzhen (CN); Xing Liu, Shenzhen (CN); Shuaihua Kou, Shenzhen (CN); Xingguang Wei, Shenzhen (CN); Jing Shi, Shenzhen (CN); Xianghui Han, Shenzhen (CN); Min Ren, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 344 days.

(21) Appl. No.: 18/488,552

(22) Filed: Oct. 17, 2023

(65) Prior Publication Data
US 2024/0049210 A1 Feb. 8, 2024

Related U.S. Application Data

(63) Continuation of application No. PCT/CN2021/093054, filed on May 11, 2021.

(51) Int. Cl.
H04W 72/11 (2023.01)
H04L 5/00 (2006.01)
H04W 72/232 (2023.01)

(52) U.S. Cl.
CPC ........... H04W 72/11 (2023.01); H04L 5/0055 (2013.01); H04W 72/232 (2023.01)

(58) Field of Classification Search
CPC .... H04W 72/11; H04W 72/232; H04L 5/0055
See application file for complete search history.

(56) References Cited

U.S. PATENT DOCUMENTS

2021/0100013 A1*   4/2021   Khoshnevisan ...... H04L 1/0061
2021/0105750 A1*   4/2021   Khoshnevisan ...... H04L 1/1614
(Continued)

FOREIGN PATENT DOCUMENTS

CN       111436153 A      7/2020
WO    WO-2019/028857 A1   2/2019
(Continued)

OTHER PUBLICATIONS

Extended European Search Report for EP Appl. No. 21941255.8, dated Mar. 21, 2024 (7 pages).
(Continued)

*Primary Examiner* — Michael J Moore, Jr.
(74) *Attorney, Agent, or Firm* — Foley & Lardner LLP

(57) ABSTRACT

A wireless communication method includes receiving, by a User Equipment, from a Base Station, two or more downlink control resources corresponding to a same Semi-Persistent Scheduling transmission for multicast servicers. The two or more downlink control resources include a first downlink control resource corresponding to a first downlink resource. The second downlink control resource corresponds to a second downlink resource. In response to receiving two or more downlink control resources, the wireless communication device determines at least one of a first sub-codebook or a second sub-codebook. This determination is based on at least one of first feedback information corresponding to the first downlink resource or the second feedback information corresponding to the second downlink resource.

20 Claims, 10 Drawing Sheets

(56)                    References Cited

U.S. PATENT DOCUMENTS

| | | | |
|---|---|---|---|
| 2022/0053533 A1* | 2/2022 | Lin | H04L 1/1812 |
| 2022/0271873 A1* | 8/2022 | Gao | H04L 1/1854 |
| 2022/0272706 A1* | 8/2022 | Sengupta | H04W 52/18 |
| 2022/0303979 A1* | 9/2022 | Li | H04W 72/21 |
| 2022/0322375 A1* | 10/2022 | Huang | H04W 72/044 |
| 2022/0322397 A1* | 10/2022 | Liu | H04W 72/1273 |
| 2022/0322406 A1* | 10/2022 | Liu | H04L 1/1861 |
| 2022/0329363 A1* | 10/2022 | Lee | H04L 5/0055 |
| 2022/0329364 A1* | 10/2022 | Lee | H04W 72/23 |
| 2022/0361153 A1* | 11/2022 | Liu | H04W 72/23 |
| 2023/0096989 A1* | 3/2023 | Lee | H04L 5/0055 370/329 |
| 2023/0171040 A1* | 6/2023 | Gao | H04L 5/0044 370/329 |
| 2023/0232430 A1* | 7/2023 | Zhou | H04L 12/1868 370/312 |
| 2024/0049210 A1* | 2/2024 | Hao | H04L 1/1829 |
| 2024/0056232 A1* | 2/2024 | Gao | H04L 1/1864 |
| 2024/0097833 A1* | 3/2024 | Guo | H04W 72/30 |
| 2024/0187142 A1* | 6/2024 | Lei | H04L 5/0055 |

FOREIGN PATENT DOCUMENTS

| | | |
|---|---|---|
| WO | WO-2020/223195 A1 | 11/2020 |
| WO | WO-2021/035437 A1 | 3/2021 |
| WO | WO-2022/216040 A1 | 10/2022 |

OTHER PUBLICATIONS

International Search Report and Written Opinion for PCT Appl. No. PCT/CN2020/093054, mailed Feb. 10, 2022 (8 pages).

Lenovo et al., "Discussion on reliability improvement for RRC-Connected UEs" 3GPP TSG RAN WG1 #104b-e, R1-2103547, Apr. 20, 2021, E-meeting (7 pages).

ZTE, "Mechanisms to Improve Reliability for RRC_Connected UEs" 3GPP TSG RAN WG1 Meeting #102-e, R1-2005437, Aug. 28, 2020, e-Meeting (8 pages).

* cited by examiner

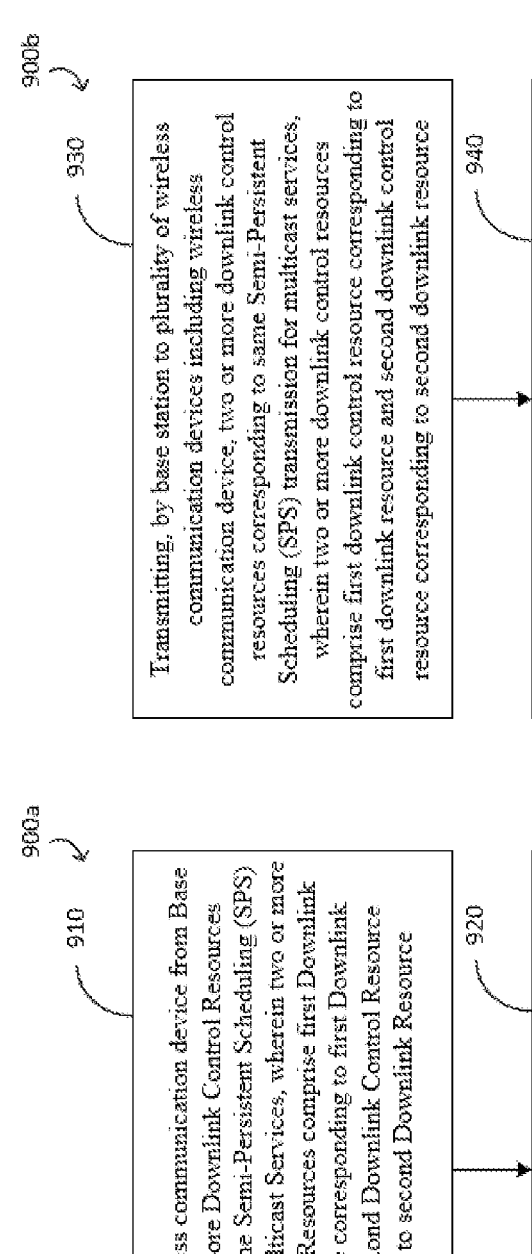

900b

930

Transmitting, by base station to plurality of wireless communication devices including wireless communication device, two or more downlink control resources corresponding to same Semi-Persistent Scheduling (SPS) transmission for multicast services, wherein two or more downlink control resources comprise first downlink control resource corresponding to first downlink resource and second downlink control resource corresponding to second downlink resource

940

Receiving, by base station from wireless communication device, codebook comprising at least one of first sub-codebook or second sub-codebook, wherein at least one of first sub-codebook or second sub-codebook is determined based on at least one of first feedback information corresponding to first downlink resource or second feedback information corresponding to second downlink resource

Receiving, by wireless communication device from Base Station, two or more Downlink Control Resources corresponding to same Semi-Persistent Scheduling (SPS) Transmission for Multicast Services, wherein two or more Downlink Control Resources comprise first Downlink Control Resource corresponding to first Downlink Control Resource and second Downlink Control Resource corresponding to second Downlink Resource

920

In response to receiving two or more Downlink Control Resources, determining, by Wireless Communication Device, at least one first Sub-codebook or second Sub-codebook based on at least one of first Feedback Information corresponding to first Downlink Resource or second Feedback Information corresponding to Second Downlink Resource

FIG. 9A

METHOD AND SYSTEM OF FEEDBACK FOR GROUP COMMON TRANSMISSION

CROSS-REFERENCE TO RELATED APPLICATION

This application claims the benefit of priority under 35 U.S.C. § 120 as a continuation of International Patent Application No. PCT/CN2021/093054, filed on May 11, 2021, the disclosure of which is incorporated herein by reference in its entirety.

TECHNICAL FIELD

The disclosure relates generally to wireless communications and, more particularly, to systems and methods for managing transmission indication in multicast and broadcast communications.

BACKGROUND

Although unicast features have been specified in previous New Radio (NR) specifications, no broadcast/multicast features have been specified for NR. Described herein are embodiments related to a series of unicast features specified in NR releases. These embodiments include, but are not limited to, Release-15 (Rel-15) and Release-16 (Rel-16).

Under the mode of Multicast Broadcast Service (MBS), the same transmission mechanism may be used by the network node (e.g., a base station) for transmitting the same information to a group of User Equipment (UEs) or all of the UEs in a cell. The MBS transmission can be carried on a Physical Downlink Shared Channel (PDSCH), which may be then received by the group of UEs or all of the UEs. The PDSCH carrying MBS information may be then designated as a group-common PDSCH or a MBS PDSCH. Specifically, there are various network environments (e.g., channel conditions) for different UEs. For improving efficiency of MBS transmissions, UEs with similar network environment are classified into a single UE group. Accordingly, the transmission mechanism selected may be configured to better match to the network environment of each UE in the group of UEs.

Accordingly, for a group of UEs receiving a same PDSCH for a MBS information, there are different methods for scheduling the PDSCH for the group of UEs. One method also utilizes a group-common Physical Downlink Control Channel (PDCCH). In this method, all of the UEs in the group detect the same PDCCH, and the PDSCH is scheduled by the PDCCH. Another method utilizes a UE-specific PDCCH for each of UEs in the group. More specifically, each of the UEs detects its own PDCCH, and the different PDCCHs schedule the same PDSCH.

In situations where the MBS information carried on the group-common PDSCH is scheduled by a MBS Downlink Control Information (DCI) carried on group-common PDCCH, the method to coordinate a group of terminals to feed back to the same multicast information has not been specified.

SUMMARY

The example arrangements disclosed herein are directed to solving the issues relating to one or more of the problems presented in the prior art, as well as providing additional features that will become readily apparent by reference to the following detailed description when taken in conjunction with the accompany drawings. In accordance with various arrangements, example systems, methods, devices and computer program products are disclosed herein. It is understood, however, that these arrangements are presented by way of example and are not limiting, and it will be apparent to those of ordinary skill in the art who read the present disclosure that various modifications to the disclosed arrangements can be made while remaining within the scope of this disclosure.

In some embodiments, a wireless communication method includes receiving, by a User Equipment (UE), from a Base Station (BS), two or more downlink control resources corresponding to a same Semi-Persistent Scheduling (SPS) transmission for multicast servicers. The two or more downlink control resources include a first downlink control resource corresponding to a first downlink resource. The second downlink control resource corresponds to a second downlink resource. In response to receiving two or more downlink control resources, the wireless communication device determines at least one of a first sub-codebook or a second sub-codebook. This determination is based on at least one of first feedback information corresponding to the first downlink resource or the second feedback information corresponding to the second downlink resource.

In other embodiments, an example wireless communication method includes a BS transmitting to a plurality of wireless communication devices including a wireless communication device, two or more downlink control resources corresponding to a same SPS transmission for multicast services. The two or more downlink control resources include a first downlink control resource corresponding to a first downlink resource and a second downlink control resource corresponding to a second downlink resource. The wireless communication method receives, by the BS from the wireless communication device, a codebook including at least one of a first sub-codebook or a second sub-codebook. At least one of the first sub-codebook or the second sub-codebook is determined based on at least one of first feedback information corresponding to the first downlink resource or second feedback information corresponding to the second downlink resource.

The above and other aspects and their implementations are described in greater detail in the drawings, the descriptions, and the claims.

BRIEF DESCRIPTION OF THE DRAWINGS

Various example arrangements of the present solution are described in detail below with reference to the following figures or drawings. The drawings are provided for purposes of illustration only and merely depict example arrangements of the present solution to facilitate the reader's understanding of the present solution. Therefore, the drawings should not be considered limiting of the breadth, scope, or applicability of the present solution. It should be noted that for clarity and ease of illustration, these drawings are not necessarily drawn to scale.

FIG. 9A is a flowchart diagram illustrating an example wireless communication method for receiving two or more downlink control resources corresponding to a same SPS transmission for multicast servicers, according to various embodiments.

FIG. 9B is a flowchart diagram illustrating an example wireless communication method for receiving two or more downlink control resources corresponding to a same SPS transmission for multicast servicers, according to various embodiments.

DETAILED DESCRIPTION

Various example arrangements of the present solution are described below with reference to the accompanying figures to enable a person of ordinary skill in the art to make and use the present solution. As would be apparent to those of ordinary skill in the art, after reading the present disclosure, various changes or modifications to the examples described herein can be made without departing from the scope of the present solution. Thus, the present solution is not limited to the example arrangements and applications described and illustrated herein. Additionally, the specific order or hierarchy of steps in the methods disclosed herein are merely example approaches. Based upon design preferences, the specific order or hierarchy of steps of the disclosed methods or processes can be re-arranged while remaining within the scope of the present solution. Thus, those of ordinary skill in the art will understand that the methods and techniques disclosed herein present various steps or acts in a sample order, and the present solution is not limited to the specific order or hierarchy presented unless expressly stated otherwise.

Figure 1:
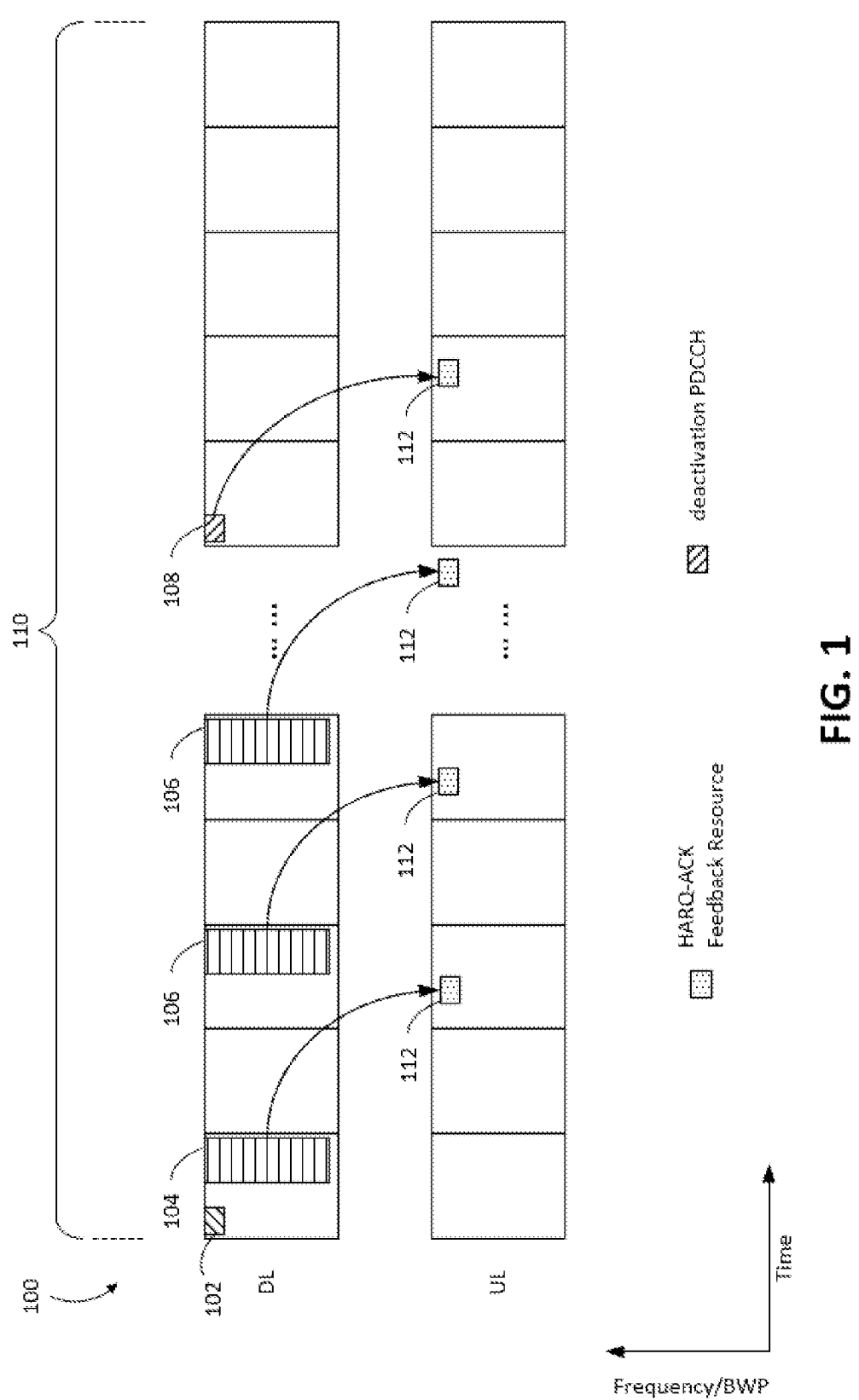
FIG. 1 is a schematic diagram of a first design of a transmission mode, according to various embodiments.

FIG. 1 is a diagram illustrating a transmission mode corresponding to an example configuration 100, according to various embodiments. In FIG. 1, the x-axis corresponds to time, and the y-axis corresponds to frequency (e.g., carrier or Bandwidth Part (BWP)). Referring to FIG. 1, MBS information is carried on a Group-Common (GC) PDSCH received by a group of UEs. The GC PDSCH may be dynamically scheduled by a DCI carried on the GC PDCCH. In various other embodiments, the GC PDSCH are transmitted in a Semi-Persistent Scheduling (SPS) manner. In these embodiments, a portion of the transmission parameters of the GC PDSCH are configured semi-statically (e.g., transmission period, feedback resource within the feedback slot) by Radio Resource Control (RRC) signaling. The SPS transmission may be activated or deactivated by downlink control activation resources (e.g., activation/deactivation PDCCH). The activation PDCCH then indicates other parameters for GC PDSCH transmission (e.g., time domain resource allocation, frequency domain resource allocation, feedback slot indicated by feedback timing (kl)). These modes are labeled as SPS MBS transmission modes or as SPS GC PDSCH.

In some embodiments, at least one of DCI format 1_0, DCI format 1_1 and DCI format 1_2 can be reused for the multicast dynamic scheduling or SPS activation by the group-common PDCCH. And at least one of the information fields, e.g., Identifier for DCI formats, TPC command for scheduled PUCCH, etc., are useless for multicast scheduling or activating, and can be re-interpreted.

Meanwhile, in some embodiments, some information should be indicated for multicast scheduling or activating. For example, Enable/disable indication of HARQ-ACK feedback, Feedback mode (ACK/NACK or NACK-only), Number of PDSCH repetition, enable/disable PTM transmission for multicast service and MCCH information changes notification, etc.

The above information can be indicated in the DCI in a joint manner. For example, as shown in Table 1, Number of PDSCH repetition and Enable/disable indication of HARQ-ACK feedback are indicated jointly.

In some embodiments, the number of PDSCH repetition larger than 1 represents disable HARQ-ACK feedback implicitly.

TABLE 1

| Value of indication information | Number of PDSCH repetition | Enable/disable indication of HARQ-ACK feedback |
|---|---|---|
| 00 | 1 | enable |
| 01 | 1 | disable |
| 10 | 2 | disable |
| 11 | 4 | disable |

In some embodiments, as another example shown in Table 2, Enable/disable indication of HARQ-ACK feedback, Feedback mode (ACK/NACK or NACK-only), Number of PDSCH repetition are indicated jointly.

TABLE 2

| Value of indication information | Number of PDSCH repetition | Enable/disable indication of HARQ-ACK feedback | Feedback mode (ACK/NACK or NACK-only) |
|---|---|---|---|
| 000 | 1 | enable | ACK/NACK |
| 001 | 1 | enable | NACK-only |
| 010 | 1 | disable | — |
| 011 | 2 | enable | ACK/NACK |
| 100 | 2 | enable | NACK-only |
| 101 | 2 | disable | — |
| 110 | 4 | disable | — |
| 111 | 8 | disable | — |

About PDSCH, in Rel-15, PDSCH processing time for PDSCH processing capability 1 and capability 2 depends on whether additional DMRS is configured.

For the PDSCH processing procedure time, $N_1$ is based on $\mu$ of Table 3 and Table 4 below for UE processing capability 1 and 2, respectively, where $\mu$ corresponds to the one of $(\mu_{PDCCH}, \mu_{PDSCH}, \mu_{UL})$ resulting with the largest $T_{proc,1}$, where the $\mu_{PDCCH}$ corresponds to the subcarrier spacing of the PDCCH scheduling the PDSCH, the $\mu_{PDSCH}$ corresponds to the subcarrier spacing of the scheduled PDSCH, and $\mu_{UL}$ corresponds to the subcarrier spacing of the uplink channel with which the HARQ-ACK is to be transmitted.

If the first uplink symbol of the PUCCH that carries the HARQ-ACK information, as defined by the assigned HARQ-ACK timing $K_1$ and the PUCCH resource to be used and including the effect of the timing advance, starts no earlier than at symbol $L_1$, where $L_1$ is defined as the next uplink symbol with its CP starting after $T_{proc,1}=(N_1+d_{1,1})(2048+144)\cdot\kappa 2^{-\mu}\cdot T_C$ after the end of the last symbol of the PDSCH carrying the TB being acknowledged, then the UE shall provide a valid HARQ-ACK message.

$N_1$ is based on $\mu$ of Table 3 and Table 4 for UE processing capability 1 and 2 respectively, where $\mu$ corresponds to the one of ($\mu_{PDCCH}$, $\mu_{PDSCH}$, $\mu_{UL}$) resulting with the largest $T_{proc,1}$, where the $\mu_{PDCCH}$ corresponds to the subcarrier spacing of the PDCCH scheduling the PDSCH, the $\mu_{PDSCH}$ corresponds to the subcarrier spacing of the scheduled PDSCH, and $\mu_{UL}$ corresponds to the subcarrier spacing of in PDSCH-ServingCellConfig is configured for the cell and set to enable.

If this PUCCH resource is overlapping with another PUCCH or PUSCH resource, then HARQ-ACK is multiplexed, otherwise the HARQ-ACK message is transmitted on PUCCH.

Otherwise the UE may not provide a valid HARQ-ACK corresponding to the scheduled PDSCH. The value of $T_{proc,1}$ is used both in the case of normal and extended cyclic prefix.

TABLE 3

| | PDSCH processing time for PDSCH processing capability 1 | |
|---|---|---|
| $\mu$ | PDSCH decoding time $N_1$ [symbols] | |
| | dmrs-AdditionalPosition = pos0 in DMRS-DownlinkConfig in both of dmrs-DownlinkForPDSCH-MappingTypeA, dmrs-DownlinkForPDSCH-MappingTypeB | dmrs-AdditionalPosition ≠ pos0 in DMRS-DownlinkConfig in either of dmrs-DownlinkForPDSCH-MappingTypeA, dmrs-DownlinkForPDSCH-MappingTypeB or if the higher layer parameter is not configured |
| 0 | 8 | $N_{1,0}$ |
| 1 | 10 | 13 |
| 2 | 17 | 20 |
| 3 | 20 | 24 | the uplink channel with which the HARQ-ACK is to be transmitted, and $\kappa = T_s/T_c = 64$, wherein $T_s = 1/(\Delta f_{ref} \cdot N_{f,ref})$, $\Delta f_{ref} = 15 \cdot 10^3$ Hz and $N_{f,ref} = 2048$, $T_c = 1/(\Delta f_{max} \cdot N_f)$ where $\Delta f_{max} = 480 \cdot 10^3$ Hz and $N_f = 4096$.

If the PDSCH DM-RS position $l_1$ for the additional DM-RS is $l_1 = 12$ then $N_{1,0} = 14$ in Table 3 below, otherwise $N_{1,0} = 13$.

If the UE is configured with multiple active component carriers, the first uplink symbol which carries the HARQ-ACK information further includes the effect of timing difference between the component carriers.

For the PDSCH mapping type A: if the last symbol of PDSCH is on the i-th symbol of the slot where i<7, then $d_{1,1} = 7 - i$, otherwise $d_{1,1} = 0$.

For UE processing capability 1: If the PDSCH is mapping type B, and if the number of PDSCH symbols allocated is 7, then $d_{1,1} = 0$, if the number of PDSCH symbols allocated is 4, then $d_{1,1} = 3$, and if the number of PDSCH symbols allocated is 2, then $d_{1,1} = 3 + d$, where d is the number of overlapping symbols of the scheduling PDCCH and the scheduled PDSCH.

For UE processing capability 2: If the PDSCH is mapping type B, if the number of PDSCH symbols allocated is 7, then $d_{1,1} = 0$, and if the number of PDSCH symbols allocated is 4, then $d_{1,1}$ is the number of overlapping symbols of the scheduling PDCCH and the scheduled PDSCH, and if the number of PDSCH symbols allocated is 2, if the scheduling PDCCH was in a 3-symbol CORESET and the CORESET and the PDSCH had the same starting symbol, then $d_{1,1} = 3$, and otherwise $d_{1,1}$ is the number of overlapping symbols of the scheduling PDCCH and the scheduled PDSCH.

For UE processing capability 2 with scheduling limitation when $\mu_{PDSCH} = 1$, if the scheduled RB allocation exceeds 136 RBs, the UE defaults to capability 1 processing time. The UE may skip decoding a number of PDSCHs with last symbol within 10 symbols before the start of a PDSCH that is scheduled to follow Capability 2, if any of those PDSCHs are scheduled with more than 136 RBs with 30 kHz SCS and following Capability 1 processing time.

For a UE that supports capability 2 on a given cell, the processing time according to UE processing capability 2 is applied if the high layer parameter processingType2Enabled

TABLE 4

| | PDSCH processing time for PDSCH processing capability 2 |
|---|---|
| $\mu$ | PDSCH decoding time $N_1$ [symbols] dmrs-AdditionalPosition = pos0 in DMRS-DownlinkConfig in both of dmrs-DownlinkForPDSCH-MappingTypeA, dmrs-DownlinkForPDSCH-MappingTypeB |
| 0 | 3 |
| 1 | 4.5 |
| 2 | 9 for frequency range 1 |

However, new DMRS parameters dmrs-DownlinkForPDSCH-MappingTypeA-DCI-1-2 and dmrs-DownlinkForPDSCH-MappingTypeB-DCI-1-2 are introduced for DCI format 1_2 in Rel-16 URLLC WI. And it hasn't reflected in current Rel-16 specification. Using the method listed below could resolve the issue.

Method 1: The PDSCH processing time is independent from DCI formats if both DCI format 1_1 and DCI format 1_2 are configured. That is, only when dmrs-AdditionalPosition='pos0' is configured in DMRS-DownlinkConfig in all of dmrs-DownlinkForPDSCH-MappingTypeA, dmrs-DownlinkForPDSCH-MappingTypeB, dmrs-DownlinkForPDSCH-MappingTypeA-DCI-1-2 and dmrs-DownlinkForPDSCH-MappingTypeB-DCI-1-2 if both DCI format 1_1 and DCI format 1_2 are configured, the PDSCH decoding time $N_1$ follows the shortened processing time for PDSCH processing capability 1 or it is an allowed case for PDSCH processing capability 2. This method will lead to a unified $N_1$ regardless of any DCI formats, but would cause a larger processing time even when a PDSCH is not scheduled with additional DMRS for PDSCH processing capability 1, and it would restrict the scheduling for PDSCH processing capability 2. For example 1, Method 1 is corresponding to Table 5 and Table 6.

TABLE 5

PDSCH processing time for PDSCH processing capability 1

| $\mu$ | PDSCH decoding time $N_1$ [symbols] | |
| --- | --- | --- |
| | dmrs-AdditionalPosition = 'pos0' in DMRS-DownlinkConfig in both of dmrs-DownlinkForPDSCH-MappingTypeA and dmrs-DownlinkForPDSCH-MappingTypeB if only DCI format 1_1 is configured, or dmrs-AdditionalPosition = 'pos0' in DMRS-DownlinkConfig in both of dmrs-DownlinkForPDSCH-MappingTypeA-DCI-1-2 and dmrs-DownlinkForPDSCH-MappingTypeB-DCI-1-2 if only DCI format 1_2 is configured, or dmrs-AdditionalPosition = 'pos0' in DMRS-DownlinkConfig in all of dmrs-DownlinkForPDSCH-MappingTypeA, dmrs-DownlinkForPDSCH-MappingTypeB, dmrs-DownlinkForPDSCH-MappingTypeA-DCI-1-2 and dmrs-DownlinkForPDSCH-MappingTypeB-DCI-1-2 if both DCI format 1_1 and DCI format 1_2 are configured | dmrs-AdditionalPosition ≠ 'pos0' in DMRS-DownlinkConfig in either of dmrs-DownlinkForPDSCH-MappingTypeA or dmrs-DownlinkForPDSCH-MappingTypeB or if the higher layer parameter is not configured if only DCI format 1_1 is configured, or dmrs-AdditionalPosition ≠ 'pos0' in DMRS-DownlinkConfig in either of dmrs-DownlinkForPDSCH-MappingTypeA-DCI-1-2 or dmrs-DownlinkForPDSCH-MappingTypeB-DCI-1-2 or if the higher layer parameter is not configured if only DCI format 1_2 is configured, or dmrs-AdditionalPosition ≠ 'pos0' in DMRS-DownlinkConfig in any of dmrs-DownlinkForPDSCH-MappingTypeA, dmrs-DownlinkForPDSCH-MappingTypeB, dmrs-DownlinkForPDSCH-MappingTypeA-DCI-1-2 or dmrs-DownlinkForPDSCH-MappingTypeB-DCI-1-2 or if the higher layer parameter is not configured if both DCI format 1_1 and DCI format 1_2 are configured |
| 0 | 8 | $N_{1,0}$ |
| 1 | 10 | 13 |
| 2 | 17 | 20 |
| 3 | 20 | 24 |

TABLE 6

PDSCH processing time for PDSCH processing capability 2

| $\mu$ | PDSCH decoding time $N_1$ [symbols] dmrs-AdditionalPosition = 'pos0' in DMRS-DownlinkConfig in both of dmrs-DownlinkForPDSCH-MappingTypeA and dmrs-DownlinkForPDSCH-MappingTypeB if only DCI format 1_1 is configured, or dmrs-AdditionalPosition = 'pos0' in DMRS-DownlinkConfig in both of dmrs-DownlinkForPDSCH-MappingTypeA-DCI-1-2 and dmrs-DownlinkForPDSCH-MappingTypeB-DCI-1-2 if only DCI format 1_2 is configured, or dmrs-AdditionalPosition = 'pos0' in DMRS-DownlinkConfig in all of |
| --- | --- |

TABLE 6-continued

PDSCH processing time for PDSCH processing capability 2

| | |
| --- | --- |
| | dmrs-DownlinkForPDSCH-MappingTypeA, dmrs-DownlinkForPDSCH-MappingTypeB, dmrs-DownlinkForPDSCH-MappingTypeA-DCI-1-2 and dmrs-DownlinkForPDSCH-MappingTypeB-DCI-1-2 if both DCI format 1_1 and DCI format 1_2 are configured |
| 0 | 3 |
| 1 | 4.5 |
| 2 | 9 for frequency range 1 |

For example 2, Method 1 is corresponding to Table 7 and Table 8.

TABLE 7

PDSCH processing time for PDSCH processing capability 1

| $\mu$ | PDSCH decoding time $N_1$ [symbols] | |
| --- | --- | --- |
| | dmrs-AdditionalPosition = 'pos0' in DMRS-DownlinkConfig in both of dmrs-DownlinkForPDSCH-MappingTypeA and dmrs-DownlinkForPDSCH-MappingTypeB if only DCI format 1_1 is configured, or dmrs-AdditionalPosition = 'pos0' in DMRS-DownlinkConfig in all of dmrs-DownlinkForPDSCH-MappingTypeA, dmrs-DownlinkForPDSCH-MappingTypeB, dmrs-DownlinkForPDSCH-MappingTypeA-DCI-1-2 and dmrs- | dmrs-AdditionalPosition ≠ 'pos0' in DMRS-DownlinkConfig in either of dmrs-DownlinkForPDSCH-MappingTypeA or dmrs-DownlinkForPDSCH-MappingTypeB or if the higher layer parameter is not configured if only DCI format 1_1 is configured, or dmrs-AdditionalPosition ≠ 'pos0' in DMRS-DownlinkConfig in any of dmrs-DownlinkForPDSCH-MappingTypeA, dmrs-DownlinkForPDSCH-MappingTypeB, |

TABLE 7-continued

| | PDSCH processing time for PDSCH processing capability 1 | |
|---|---|---|
| | DownlinkForPDSCH-MappingTypeB-DCI-1-2 if both DCI format 1_1 and DCI format 1_2 are configured | dmrs-DownlinkForPDSCH-MappingTypeA-DCI-1-2 or dmrs-DownlinkForPDSCH-MappingTypeB-DCI-1-2 or if the higher layer parameter is not configured if both DCI format 1_1 and DCI format 1_2 are configured |
| 0 | 8 | $N_{1,0}$ |
| 1 | 10 | 13 |
| 2 | 17 | 20 |
| 3 | 20 | 24 |

TABLE 8

| | PDSCH processing time for PDSCH processing capability 2 |
|---|---|
| $\mu$ | PDSCH decoding time $N_1$ [symbols] dmrs-AdditionalPosition = 'pos0' in DMRS-DownlinkConfig in both of dmrs-DownlinkForPDSCH-MappingTypeA and dmrs-DownlinkForPDSCH-MappingTypeB if only DCI format 1_1 is configured, or dmrs-AdditionalPosition = 'pos0' in DMRS-DownlinkConfig in all of dmrs-DownlinkForPDSCH-MappingTypeA, dmrs-DownlinkForPDSCH-MappingTypeB, dmrs- |

TABLE 8-continued

| | PDSCH processing time for PDSCH processing capability 2 |
|---|---|
| | DownlinkForPDSCH-MappingTypeA-DCI-1-2 and dmrs-DownlinkForPDSCH-MappingTypeB-DCI-1-2 if both DCI format 1_1 and DCI format 1_2 are configured |
| 0 | 3 |
| 1 | 4.5 |
| 2 | 9 for frequency range 1 |

For example 3, Method 1 is corresponding to Table 9 and Table 10.

TABLE 9

| | PDSCH processing time for PDSCH processing capability 1 | |
|---|---|---|
| | PDSCH decoding time $N_1$ [symbols] | |
| $\mu$ | dmrs-AdditionalPosition = 'pos0' in DMRS-DownlinkConfig in both of dmrs-DownlinkForPDSCH-MappingTypeA and dmrs-DownlinkForPDSCH-MappingTypeB if only DCI format 1_1 is configured, or dmrs-AdditionalPosition = 'pos0' in DMRS-DownlinkConfig in all of dmrs-DownlinkForPDSCH-MappingTypeA, dmrs-DownlinkForPDSCH-MappingTypeB, dmrs-DownlinkForPDSCH-MappingTypeA-DCI-1-2 and dmrs-DownlinkForPDSCH-MappingTypeB-DCI-1-2 if configured if both DCI format 1_1 and DCI format 1_2 are configured | dmrs-AdditionalPosition # 'pos0' in DMRS-DownlinkConfig in either of dmrs-DownlinkForPDSCH-MappingTypeA or dmrs-DownlinkForPDSCH-MappingTypeB or if the higher layer parameter is not configured if only DCI format 1_1 is configured, or dmrs-AdditionalPosition # 'pos0' in DMRS-DownlinkConfig in any of dmrs-DownlinkForPDSCH-MappingTypeA, dmrs-DownlinkForPDSCH-MappingTypeB, dmrs-DownlinkForPDSCH-MappingTypeA-DCI-1-2 or dmrs-DownlinkForPDSCH-MappingTypeB-DCI-1-2 if configured or if the higher layer parameter is not configured if both DCI format 1_1 and DCI format 1_2 are configured |
| 0 | 8 | $N_{1,0}$ |
| 1 | 10 | 13 |
| 2 | 17 | 20 |
| 3 | 20 | 24 |

TABLE 10

| PDSCH processing time for PDSCH processing capability 2 | |
| --- | --- |
| PDSCH decoding time $N_1$ [symbols] | |
| μ | dmrs-AdditionalPosition = 'pos0' in DMRS-DownlinkConfig in both of dmrs-DownlinkForPDSCH-MappingTypeA and dmrs-DownlinkForPDSCH-MappingTypeB if only DCI format 1_1 is configured, or dmrs-AdditionalPosition = 'pos0' in DMRS-DownlinkConfig in all of dmrs-DownlinkForPDSCH-MappingTypeA, dmrs-DownlinkForPDSCH-MappingTypeB, dmrs-DownlinkForPDSCH-MappingTypeA-DCI-1-2 and dmrs-DownlinkForPDSCH-MappingTypeB-DCI-1-2 if configured if both DCI format 1_1 and DCI format 1_2 are configured |
| 0 | 3 |
| 1 | 4.5 |
| 2 | 9 for frequency range 1 |

For example 4, Method 1 is corresponding to Table 11 and Table 12.

TABLE 11

| PDSCH processing time for PDSCH processing capability 1 | | |
| --- | --- | --- |
| PDSCH decoding time $N_1$ [symbols] | | |
| μ | dmrs-AdditionalPosition = 'pos0' in DMRS-DownlinkConfig in all of dmrs-DownlinkForPDSCH-MappingTypeA, dmrs-DownlinkForPDSCH-MappingTypeB, dmrs-DownlinkForPDSCH-MappingTypeA-DCI-1-2 and dmrs-DownlinkForPDSCH-MappingTypeB-DCI-1-2 if configured | dmrs-AdditionalPosition # 'pos0' in DMRS-DownlinkConfig in any of dmrs-DownlinkForPDSCH-MappingTypeA, dmrs-DownlinkForPDSCH-MappingTypeB, dmrs-DownlinkForPDSCH-MappingTypeA-DCI-1-2 and dmrs-DownlinkForPDSCH-MappingTypeB-DCI-1-2 if configured, or if at least one of the higher layer parameter dmrs-DownlinkForPDSCH-MappingTypeA and dmrs-DownlinkForPDSCH-MappingTypeB is not configured if DCI format 1_1 configured, or if at least one of the higher layer parameter dmrs-DownlinkForPDSCH-MappingTypeA-DCI-1-2 and dmrs-DownlinkForPDSCH-MappingTypeB-DCI-1-2 is not configured if DCI format 1_2 configured |
| 0 | 8 | $N_{1,0}$ |
| 1 | 10 | 13 |
| 2 | 17 | 20 |
| 3 | 20 | 24 |

TABLE 12

| PDSCH processing time for PDSCH processing capability 2 | |
| --- | --- |
| PDSCH decoding time $N_1$ [symbols] | |
| μ | dmrs-AdditionalPosition = 'pos0' in DMRS-DownlinkConfig in all of dmrs-DownlinkForPDSCH-MappingTypeA, dmrs-DownlinkForPDSCH-MappingTypeB, dmrs-DownlinkForPDSCH-MappingTypeA-DCI-1-2 and dmrs-DownlinkForPDSCH-MappingTypeB-DCI-1-2 if configured |
| 0 | 3 |
| 1 | 4.5 |
| 2 | 9 for frequency range 1 |

In embodiments that utilize SPS MBS transmission modes, one or more SPS transmission configurations are configured via RRC signaling. In these embodiments, an activation PDCCH 102 is used for activating the SPS MBS transmission. The activation PDCCH 102 may be shared by a group of UEs 110 (e.g., a GC PDCCH). The GC PDSCH is transmitted according to the SPS transmission configuration configured via the RRC signaling and indicated by the activation PDCCH 102. As shown in FIG. 1, the first PDSCH after the activation PDCCH 102 is the SPS PDSCH with scheduling PDCCH 104. The second PDSCH after the activation PDCCH 102 is a SPS PDSCH without scheduling PDCCH 106 (e.g., SPS PDSCH). The SPS PDSCH without scheduling PDCCH 106 is disposed between the activation PDCCH 102 and a deactivation PDCCH 108, the deactivation PDCCH can also be called as release PDCCH.

In some embodiments, the SPS PDSCH with scheduling PDCCH 104 is considered as a dynamic scheduling PDSCH. In these embodiments, a corresponding Hybrid Automatic Repeat Request Acknowledgement (HARQ-ACK) bit is inserted into a HARQ-ACK feedback codebook or sub-codebook of the dynamic scheduling PDSCH. Additionally, the HARQ-ACK bits correspond to various other SPS PDSCHs, i.e., SPS PDSCH without scheduling PDCCH, will form a HARQ-ACK feedback codebook or sub-codebook of SPS scheduling PDSCH. In these embodiments, the HARQ-ACK bits correspond to SPS PDSCHs without scheduling PDCCH are added after the HARQ-ACK bits for the dynamic scheduling PDSCHs in the HARQ-ACK feedback codebook. And the HARQ-ACK bits will be transmitted on the HARQ-ACK feedback resource 112.

In some embodiments, the HARQ-ACK feedback codebook transmitted on the HARQ-ACK feedback resource 112 includes a first sub-codebook and a second sub-codebook. The first sub-codebook is for dynamic scheduling PDSCHs (including SPS PDSCH with scheduling PDCCH 104). The second sub-codebook is for SPS PDSCHs without scheduling PDCCH 106. The first sub-codebook is disposed in front of the second sub-codebook.

Figure 2:
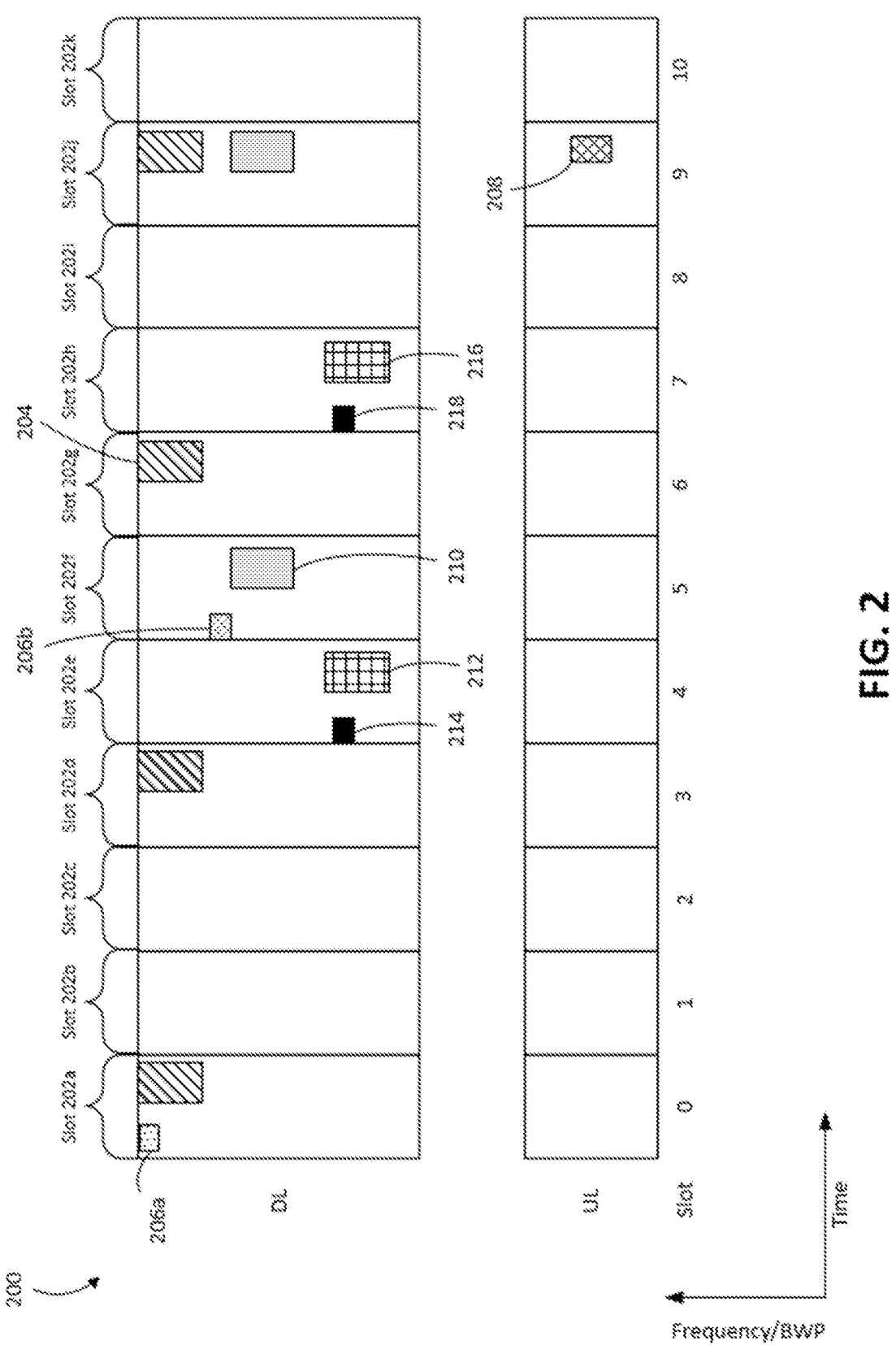
FIG. 2 is a schematic diagram of a second design of a transmission mode, according to various embodiments.

FIG. 2 is a diagram illustrating a transmission mode corresponding to an example configuration 200, according to various embodiments. In FIG. 2, the x-axis corresponds to time, and the y-axis corresponds to frequency (e.g., carrier or BWP). The configuration 200 includes eleven slots, detonated as slots 202a, 202b, 202c, 202d, 202e, 202f, 202g, 202h, 202i, 202j, and 202k (collectively the slots 202a-202k). As illustrated in FIG. 2, the configuration 200 includes a first PDSCH 204 disposed in slot 202g. The first PDSCH 204 is configured to be a SPS PDSCH without scheduling PDCCH (e.g., such as the SPS PDSCH without scheduling PDCCH 106 of FIG. 1). The configuration 200 includes a first activation PDCCH 206a (e.g., such as the activation PDCCH 102 of FIG. 1) disposed in slot 202a. The activation of the first PDSCH 204 is performed by the first activation PDCCH 206a. The feedback timing (i.e., K1) indicated in the first activation PDCCH 206a is equal to 3. The first PDSCH 204 is indicated to feedback in slot 202j.

The configuration 200 includes a second PDSCH 210 disposed in slot 202f. The second PDSCH 210 is configured to be a SPS PDSCH with scheduling PDCCH (e.g., such as SPS PDSCH with scheduling PDCCH 104 of FIG. 1). The configuration 200 includes a second activation PDCCH 206b (e.g., such as the activation PDCCH 102 of FIG. 1) disposed in slot 202f. The activation of the second PDSCH 210 is performed by the second activation PDCCH 206b. The feedback timing (i.e., K1) indicated in the activation PDCCH 206 is equal to 4. The second PDSCH 210 is configured to be fed back in slot 202j.

The configuration 200 includes a third PDSCH 212 and a first PDCCH 214 are both disposed in slot 202e. The third PDSCH 212 is configured to be a dynamic scheduling PDSCH scheduled by the first PDCCH 214. The feedback timing (i.e., K1) indicated in the first PDCCH 214 is equal to 5. The third PDSCH 212 is configured to feedback in slot 202j.

The configuration 200 includes a fourth PDSCH 216 and a second PDCCH 218 both disposed in slot 202h. The fourth PDSCH 216 is configured to be a dynamic scheduling PDSCH scheduled by the second PDCCH 218. The feedback timing (i.e., K1) indicated in the second PDCCH 218 is equal to 2. The fourth PDSCH 216 is configured to feedback in slot 202j.

The first PDSCH 204, the second PDSCH 210, the third PDSCH 212, and the fourth PDSCH 216 are all configured to feedback in the same slot (e.g., slot 202j). The same HARQ-ACK feedback resource (e.g., the HARQ-ACK feedback resource 208) is selected for transmitting the HARQ-ACK feedback information. Each PDSCH 204, 210, 212, 216 is associated with a HARQ-ACK bit. In the exemplary embodiment, there are four HARQ-ACK bits for the four PDSCHs 204, 210, 212, 216, respectively.

The HARQ-ACK bit associated with the first PDSCH 204 is disposed in the second sub-codebook (e.g., of the HARQ-ACK feedback codebook). The HARQ-ACK bits order determination for transmitting the HARQ-ACK feedback information first occurs with the dynamic scheduling PDSCHs (e.g., the second PDSCH 210, the third PDSCH 212, and the fourth PDSCH 216). After the feedback bits corresponding with dynamic scheduling PDSCHs, the first PDSCH 204 is then added.

The bits order for the HARQ-ACK feedback codebook are based on which PDSCH is scheduled at the previous Monitoring Occasion (MO) to first occupy the bit. The PDSCHs scheduled by PDCCHs within the same MO (or MOs have a same starting symbol) are further compared with at least one of the frequency domain location (e.g., such as the Control Channel (CC) index) or time domain position of the PDSCHs. In an exemplary embodiment illustrated in Table 13 below, the first bit within the HARQ-ACK feedback codebook corresponds to the third PDSCH 212, the second bit corresponds to the second PDSCH 210, and the third bit corresponds to the fourth PDSCH 216. Accordingly, the value of a Downlink Assignment Index (DAI) indicates the order for the PDCCHs to correspond to the third PDSCH 212, the second PDSCH 210, and the fourth PDSCH 216. For example, the DAI value in the PDCCH for scheduling the third PDSCH 212 may be indicated to equal 1. In this example, the DAI value in the PDCCH for scheduling the second PDSCH 210 may be indicated to equal 2, while the DAI value in PDCCH for scheduling the fourth PDSCH 216 may be indicated to equal 3. Finally, the last bit corresponds to the first PDSCH 204.

TABLE 13

| Bit in HARQ-ACK feedback codebook | Corresponding PDSCH |
|---|---|
| First bit | Third PDSCH 212 |
| Second bit | Second PDSCH 210 |
| Third bit | Fourth PDSCH 216 |
| Fourth bit | First PDSCH 204 |

In scenarios where the configuration information in the first activation PDCCH 206a and the second activation PDCCH 206b are not changed, they may still send more than one activation PDCCH repeatedly. The NR Node B (gNB) retransmits the configuration information in the first activation PDCCH 206a by the second activation PDCCH 206b in response to a new UE joining the MBS group after transmission of the first activation PDCCH 206a. Accordingly, the newly added UE has the complete configuration information. In these embodiments, the second activation PDCCH 206b may be detonated as a reactivation PDCCH performing an SPS transmission reactivation without changing transmission parameters for UE receives both of the first activation PDCCH 206a and the second activation PDCCH 206b.

In some embodiments, the reactivation PDCCH (i.e., the second activation PDCCH 206b) received by the UE contains a same High Performance Network (HPN) value as compared with the previous activation PDCCH (i.e., 206a) received by the same UE. In some embodiments, the reactivation PDCCH 206b and the activation PDCCH 206a correspond to a same SPS index.

In some embodiments, the reactivation PDCCH 206b and the activation PDCCH 206a have a same Radio Network Temporary Identifier (RNTI) (e.g., Group-Configured Scheduling RNTI (G-CS-RNTI) or Single Cell (SC)-CS-RNTI). In these embodiments, a Cyclic Redundancy Check (CRC) for the DCI is carried on the reactivation PDCCH 206b and the activation PDCCH 206a scrambled with the same RNTI.

In some embodiments, a PDSCH scheduled by the reactivation PDCCH 206b may originally be a 'SPS PDSCH without scheduling PDCCH' activated by the first activation PDCCH 206a. In these embodiments, the PDSCH becomes a 'PDSCH with scheduling PDCCH' after the reactivation PDCCH 206b is transmitted for scheduling.

In some embodiments, at least a portion of the information fields are the same for DCIs carried by the reactivation PDCCH 206b and the first activation PDCCH 206a. For example, the fields other than 'Time domain resource assignment' in DCIs carried on the reactivation PDCCH 206b and the activation PDCCH 206a should be the same.

In some embodiments, the DCIs carried on the reactivation PDCCH 206b and the activation PDCCH 206a may be the same DCI format.

In some embodiments, at least one of the following parameters are configured to differ for the reactivation PDCCH 206b from the activation PDCCH 206a: (1) search space set, (2) Control Resource Set (CORESET), (3) Aggregation Level (AL), (4) parameter for calculating the Control Channel Element (CCE) index, (5) DCI format, and (6) RNTI.

For a UE without receive the activation PDCCH 206a, which has already transmitted by the gNB before the UE plans to receive the SPS transmission, the UE monitors the reactivation PDCCH according to the configurations for the reactivation PDCCH. In response to the UE receiving the reactivation PDCCH 206b, the UE does not monitor the PDCCH according to the configuration for the reactivation PDCCH. Accordingly, the search space set no longer occupies a number of blind detections and CCE. The UE may then monitor the PDCCH according to the configurations for the activation PDCCH 206a.

The reactivation PDCCH may be a GC PDCCH so that UEs that have received activation PDCCH and corresponding the MBS service may also receive the reactivation PDCCH. Accordingly, the current rules for HARQ-ACK feedback codebook generation are still applied such that the first PDSCH after the reactivation PDCCH is counted as a dynamic scheduling PDSCH. In response to a UE missing the reactivation PDCCH, the UE may still receive the PDSCH. In these scenarios, the PDSCH is still detonated as a SPS PDSCH without scheduling PDCCH. From the network perspective, the PDSCH is configured to assume the UE has received the reactivation PDCCH. In these scenarios, there may be ambiguity on the HARQ-ACK codebook. That is, which sub-codebook the feedback bit for the PDSCH scheduled for activation/reactivation PDCCH is added in, the first sub-codebook or in the second sub-codebook?

In some embodiments, the reactivation PDCCH may be oriented to the newly joined UE. For example, an AL or a transmission beam may be determined according to the channel conditions of the newly joined UE. In response, the reactivation PDCCH may not be received reliably by the UEs activated prior to the reactivation.

Figure 3:
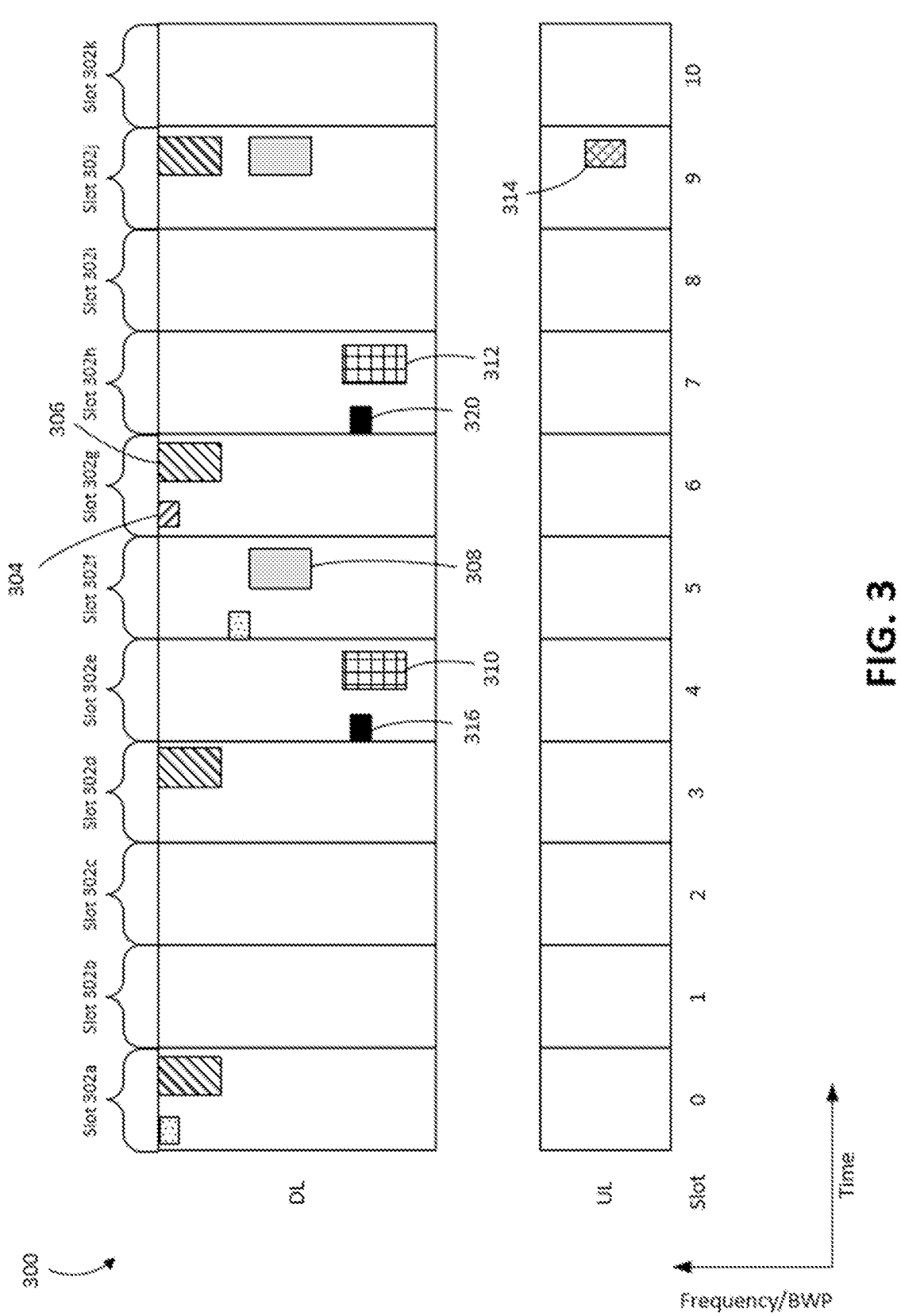
FIG. 3 is a schematic diagram of a third design of a transmission mode, according to various embodiments.

FIG. 3 is a diagram illustrating a transmission mode corresponding to an example configuration 300, according to various embodiments. In FIG. 3, the x-axis corresponds to time, and the y-axis corresponds to frequency (e.g., carrier or BWP). The configuration 300 includes eleven slots, detonated as slots 302a, 302b, 302c, 302d, 302e, 302f, 302g, 302h, 302i, 302j, and 302k (collectively the slots 302a-302k). As illustrated in FIG. 3, the configuration 300 includes a reactivation PDCCH 304 disposed before the first PDSCH 306. As detailed above in regards to FIG. 2, the first PDSCH 306, a second PDSCH 308, a third PDSCH 310, and a fourth PDSCH 312 are fed back on a HARQ-ACK feedback resource 314 disposed in slot 302j. In response to a UE receiving the reactivation PDCCH 304 successfully, the first PDSCH 306 is configured to be a dynamic scheduling PDSCH. Accordingly, the feedback information corresponding to the first PDSCH 306 is in the first sub-codebook, and is ranked together with other dynamic scheduling PDSCHs.

As illustrated in Table 14 below, (1) a first bit of the HARQ-ACK feedback codebook corresponds to the third PDSCH 310, (2) a second bit corresponds to the second PDSCH 308, (3) a third bit corresponds to the first PDSCH 306, and (4) a fourth bit corresponds to the fourth PDSCH 312. The values of the DAI for the PDCCHs corresponding to the third PDSCH 310, the second PDSCH 308, the first PDSCH 306, and the fourth PDSCH 312, respectively, indicate the order for the third PDSCH 310, the second PDSCH 308, the first PDSCH 306, and the fourth PDSCH 312. For example, the DAI value in the PDCCH that schedules the third PDSCH 310 is equal to 1, the DAI value in the PDCCH that schedules the second PDSCH 308 is equal to 2, the DAI value in the PDCCH that schedules the first PDSCH 306 is equal to 3, and the DAI value in the PDCCH that schedules the fourth PDSCH 312 is equal to 4.

TABLE 14

| Bit in HARQ-ACK feedback codebook | Corresponding PDSCH |
| --- | --- |
| First bit | Third PDSCH 310 |
| Second bit | Second PDSCH 308 |
| Third bit | First PDSCH 306 |
| Fourth bit | Fourth PDSCH 312 |

In a scenario where a UE misses the reactivation PDCCH 304, the first PDSCH 306 is detonated as a SPS PDSCH without scheduling PDCCH. The feedback information corresponding to the first PDSCH 306 is added after feedback bits of the dynamic scheduling PDSCH.

Furthermore, as the first PDSCH 306 is counted as a dynamic scheduling PDSCH in view of the gNB, the DAI value for the reactivation PDCCH 304 for scheduling the first PDSCH 306 is also accumulated. For example, the DAI value in a PDCCH for scheduling the third PDSCH 310 is equal to 1, the DAI value in a PDCCH for scheduling the second PDSCH 308 is equal to 2, the DAI value in a PDCCH for scheduling the first PDSCH 306 is equal to 3, and the DAI value in a PDCCH for scheduling the fourth PDSCH 312 is equal to 4. In response to the UE missing the PDCCH for scheduling the first PDSCH 306, the UE receives a discontinuous DAI value from the remaining PDCCHs (e.g., 1, 2, and 4). The UE then considers that a PDCCH (between the PDCCH for scheduling the second PDSCH 308 and PDCCH for scheduling the fourth PDSCH 312) and the corresponding PDSCH are missed, and one feedback bit between the feedback bits for the second PDSCH 308 and the fourth PDSCH 312 is set to NACK. In these scenarios, the UE is not aware that the missing PDCCH is for scheduling the first PDSCH 306.

The UE proceeds to feedback to five (5) bits in the HARQ-ACK feedback codebook. As detailed in Table 15 below, the first bit within the HARQ-ACK feedback codebook corresponds to the third PDSCH 310, the second bit corresponds to the second PDSCH 308, the third bit becomes NACK, and the fourth bit corresponds to the fourth PDSCH 312. Accordingly, the UE is unaware which PDSCH the third bit corresponds to. The fifth bit corresponds to SPS PDSCH without scheduling PDCCH (e.g., the first PDSCH 306). This results in ambiguity between the base station and the terminal.

TABLE 15

| Bit in HARQ-ACK feedback codebook | Corresponding PDSCH |
| --- | --- |
| First bit | Third PDSCH 310 |
| Second bit | Second PDSCH 308 |
| Third bit | — |
| Fourth bit | Fourth PDSCH 312 |
| Fifth bit | First PDSCH 306 |

Figure 4:
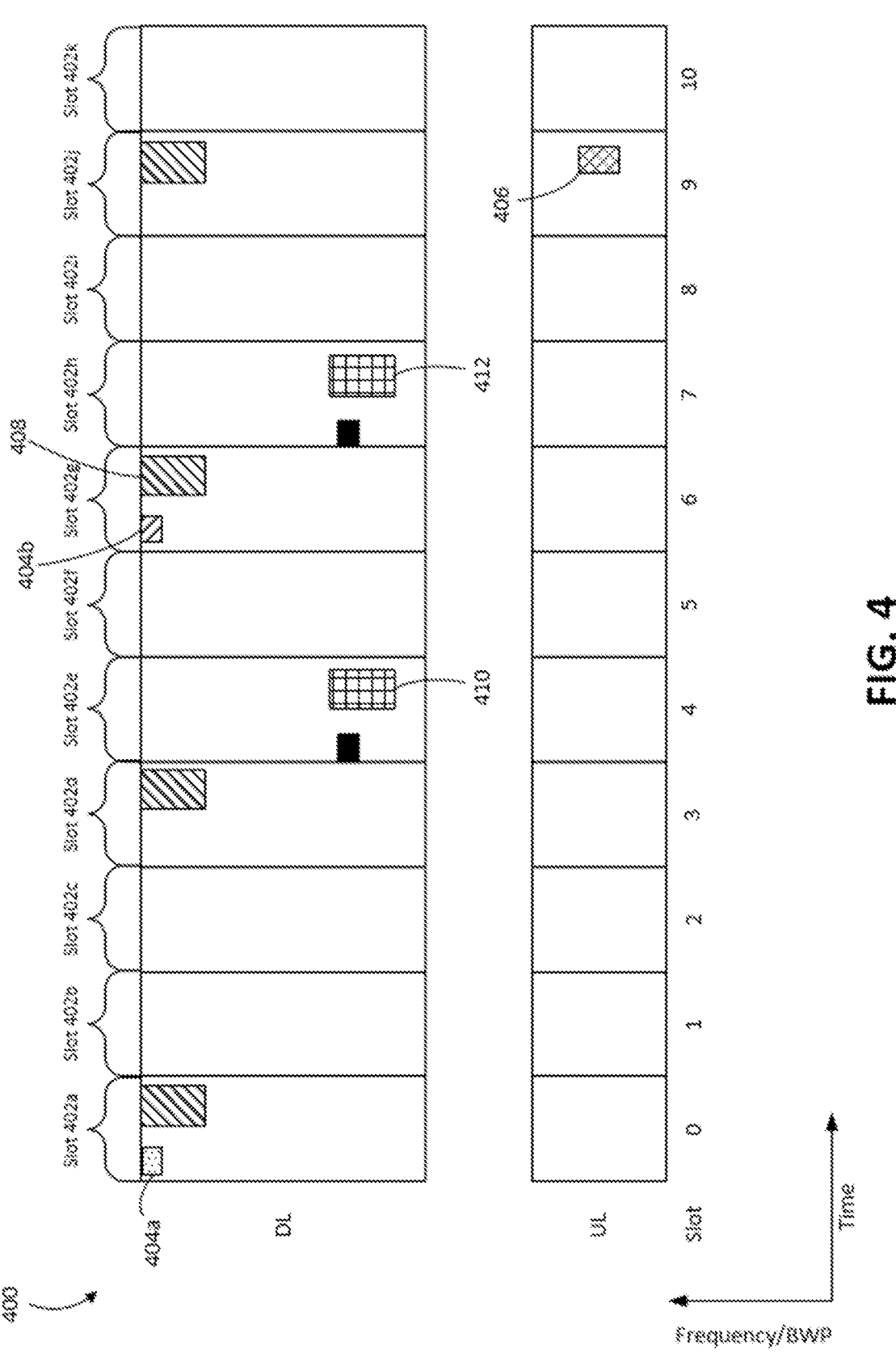
FIG. 4 is a schematic diagram of a fourth design of a transmission mode, according to various embodiments.

FIG. 4 is a diagram illustrating a transmission mode corresponding to an example configuration 400, according to various embodiments. In FIG. 4, the x-axis corresponds to time, and the y-axis corresponds to frequency (e.g., carrier or BWP). The configuration 400 includes eleven slots, detonated as slots 402*a*, 402*b*, 402*c*, 402*d*, 402*e*, 402*f*, 402*g*, 402*h*, 402*i*, 402*j*, and 402*k* (collectively the slots 402*a*-402*k*). As illustrated in FIG. 4, the configuration 400 describes a feedback method for SPS group common transmission. A UE may receive more than one activation PDCCHs for activating a same SPS transmission. Accordingly, a PDSCH scheduled by an reactivation PDCCH 404*b* after an activation PDCCH 404*a* (e.g., such as the activation PDCCH 102 in FIG. 1) is fed back as a 'SPS PDSCH without scheduling PDCCH' (SPS PDSCH). In other words, a HARQ-ACK feedback bit is in a second sub-codebook carrying feedback bits corresponding to 'SPS PDSCHs without scheduling PDCCH'. The second sub-codebook is added after a first sub-codebook. The activation PDCCH 404*a* received by a UE is considered as an initial activation PDCCH for that UE. The activation PDCCH(s) 404*b* received after the initial activation PDCCH 404*a* acts as a reactivation PDCCH for the UE. The SPS transmission activated by the reactivation PDCCH 404*b* includes the same transmission parameters as the activation PDCCH 404*a*.

In the configuration 400 illustrated in FIG. 4, the UE receives both the activation PDCCH 404*a* disposed in slot 402*a* and the reactivation PDCCH 404*b* in slot 402*g*. In response, a PDSCH 408 scheduled by the reactivation PDCCH 404*b* is fed back as a SPS PDSCH without scheduling PDCCH. Accordingly, the HARQ-ACK feedback bit for the PDSCH 408 is added after the feedback bits for the PDSCHs corresponding to the dynamic scheduling PDSCHs.

As shown in Table 16, PDSCH 410, PDSCH 408, and PDSCH 412 correspond to the HARQ-ACK feedback resource 406 in slot 402*j*. Accordingly, feedback bits in the feedback codebook respectively correspond to PDSCH 410, PDSCH 412, and PDSCH 408. The DAI values in PDCCH for scheduling PDSCH 410, PDSCH 408, and the fourth PDSCH 412 are continuous. In some embodiments, the UE ignores the DAI value in the reactivation PDCCH 404*b*.

TABLE 16

| Bit in HARQ-ACK feedback codebook | Corresponding PDSCH |
|---|---|
| First bit | PDSCH 410 |
| Second bit | PDSCH 412 |
| Third bit | PDSCH 408 |

In scenarios where another UE receives only the activation PDCCH 404*b* in slot 402*g* (i.e., doesn't receive the activation PDCCH 404*a* in slot 402*a*. For example, the UE joins the group after the transmission of the activation PDCCH 404*a*), the PDCCH 404*b* acts as activation PDCCH for this UE. And PDSCH 408 scheduled by the activation PDCCH 404*b* is fed back as a SPS PDSCH with scheduling PDCCH or a dynamic scheduling PDSCH. In these embodiments, the HARQ-ACK feedback bit for the PDSCH 408 is inserted within the feedback bits corresponding to the dynamic scheduling PDSCHs.

As shown in Table 17 below, the PDSCH 410, the PDSCH 408, and the PDSCH 412 correspond to the HARQ-ACK feedback resource 406 in slot 402*j*. Accordingly, feedback bits in the feedback codebook respectively correspond to the PDSCH 410, the PDSCH 408, and the PDSCH 412. The DAI values in PDCCHs for scheduling third PDSCH 410, the second PDSCH 408, and the fourth PDSCH 412 are continuous.

TABLE 17

| Bit in HARQ-ACK feedback codebook | Corresponding PDSCH |
|---|---|
| First bit | PDSCH 410 |
| Second bit | PDSCH 408 |
| Third bit | PDSCH 412 |

By defining this rule in configuration 400 for feedback for the SPS group common transmission, ambiguity between the gNB and the UE on determine the HARQ-ACK feedback codebook for the SPS group common transmission with the reactivation PDCCH 404*b* is avoided.

In another embodiment of FIG. 4, a feedback method for SPS group common transmission is described. This embodiment defines the rule that all SPS transmissions (including SPS PDSCHs with or without scheduling PDCCH) are fed back in the SPS manner. In these embodiments, the HARQ-ACK feedback bits for all SPS transmissions (including PDSCHs with or without scheduling PDCCH) are in the second sub-codebook and are added after the first sub-codebook carrying feedback bits corresponds to the dynamic scheduling PDSCHs.

In the scenario illustrated in FIG. 4 and Table 16, the PDSCH 410, the PDSCH 408, and the PDSCH 412 correspond to the HARQ-ACK feedback resource 406 in slot 402*j*. Regardless of whether the activation PDCCH 404*b* is the activation PDCCH for the UE or the reactivation PDCCH, the UE feedbacks to the PDSCH 408 as a 'SPS PDSCH without scheduling PDCCH.' Then, feedback bits in the HARQ-ACK feedback codebook correspond, in turn, to the PDSCH 410, the PDSCH 412, and the PDSCH 408. The DAI values of the PDCCHs for scheduling the PDSCH 410 and the PDSCH 412 are continuous. In these embodiments, the UE ignores the DAI value from the activation PDCCH and reactivation PDCCH.

By defining this rule in configuration 400 for feedback for SPS group common transmission, ambiguity between gNB and UE on determine the HARQ-ACK feedback codebook for SPS group common transmission with the reactivation PDCCH 404*b* is avoided.

In another embodiment of FIG. 4, another feedback method for SPS group common transmission is described. This embodiment defines the rule that PDSCH scheduled by the activation PDCCH 404*a*, 404*b* are fed back in both of the first sub-codebook and the second sub-codebook. The size of the first sub-codebook corresponding to the PDSCHs with PDCCHs (including dynamic scheduling PDSCHs and SPS PDSCHs with scheduling PDCCHs) are determined by DAI value in the scheduling PDCCH. Meanwhile, the size of the second sub-codebook corresponding to SPS PDSCHs is determined by all SPS PDSCH occasions (including SPS PDSCHs with scheduling PDCCHs and SPS PDSCHs without scheduling PDCCHs).

In the scenario illustrated in FIG. 4, the PDSCH 410, the PDSCH 408, and the PDSCH 412 correspond to the HARQ-ACK feedback resource 406 in slot 402*j*. Regardless of whether the scheduling PDCCH for the PDSCH 408 is the initial activation PDCCH or the reactivation PDCCH, the UE is fed back in both the first sub-codebook and the second sub-codebook. In this scenario, there are 4 bits in total that are transmitted in the HARQ-ACK feedback codebook.

The detail mapping between feedback bits in the HARQ-ACK feedback codebook and PDSCHs are illustrated below in Table 18. The UE feeds back the second PDSCH 408 as a 'SPS PDSCH without scheduling PDCCH.' Feedback bits in the HARQ-ACK feedback codebook correspond, in turn, to the PDSCH 410, the PDSCH 408, the PDSCH 412, and the PDSCH 408. The DAI values of the PDCCHs for scheduling the PDSCH 410, the PDSCH 408 and the PDSCH 412 are continuous.

TABLE 18

| Bit in HARQ-ACK feedback codebook | Corresponding PDSCH |
| --- | --- |
| First bit | PDSCH 410 |
| Second bit | PDSCH 408 |
| Third bit | PDSCH 412 |
| Fourth bit | PDSCH 408 |

Furthermore, in response to the UE missing the PDCCH for scheduling the PDSCH 408, the UE receives a discontinuous DAI value from the remaining PDCCHs corresponding to PDSCH 410 and PDSCH 412 (e.g., 1 and 3). The UE then considers that a PDCCH (between the PDCCH for scheduling the PDSCH 410 and PDCCH for scheduling the PDSCH 412) and the corresponding PDSCH are missed, and one feedback bit between the feedback bits for the PDSCH 410 and the PDSCH 410 is set to NACK. In these scenarios, the UE is not aware that the missing PDCCH is for scheduling the PDSCH 408.

The UE proceeds to feedback to four (4) bits in the HARQ-ACK feedback codebook. As detailed in Table 19 below, the first bit within the HARQ-ACK feedback codebook corresponds to the PDSCH 410, the second bit sets to NACK, and the third bit corresponds to the PDSCH 412. Accordingly, the UE is unaware which PDSCH the second bit corresponds to. The fourth bit corresponds to SPS PDSCH without scheduling PDCCH (e.g., the PDSCH 408).

TABLE 19

| Bit in HARQ-ACK feedback codebook | Corresponding PDSCH |
| --- | --- |
| First bit | PDSCH 410 |
| Second bit | — |
| Third bit | PDSCH 412 |
| Fourth bit | PDSCH 408 |

By defining the rule stated above for configuration 400 for feedback for SPS group common transmission, ambiguity between gNB and UE on determine the HARQ-ACK feedback codebook for SPS group common transmission with the reactivation PDCCH is avoided.

Figure 5:
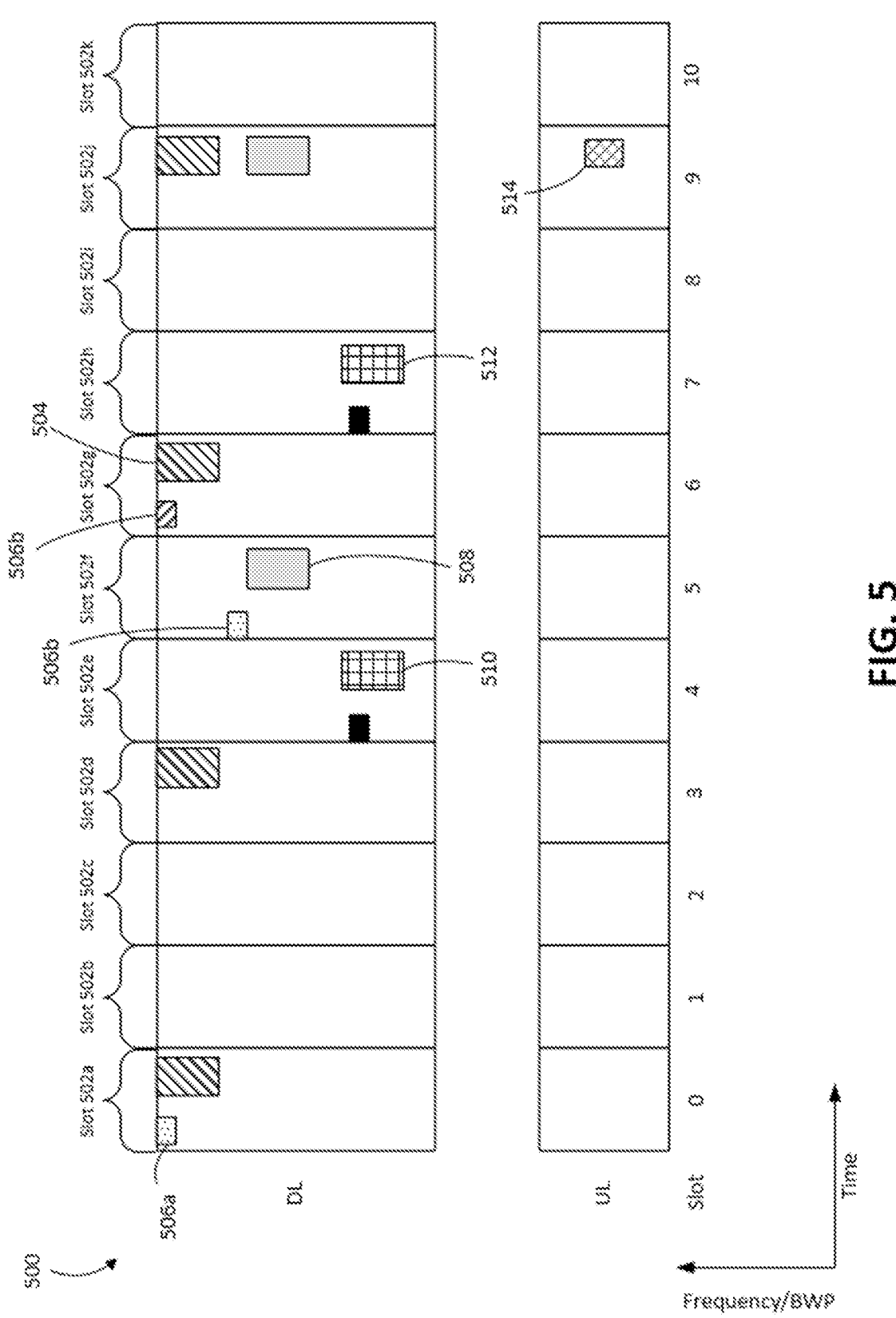
FIG. 5 is a schematic diagram of a fifth design of a transmission mode, according to various embodiments.

FIG. 5 is a diagram illustrating a transmission mode corresponding to an example configuration 500, according to various embodiments. In FIG. 5, the x-axis corresponds to time, and the y-axis corresponds to frequency (e.g., carrier or BWP). The configuration 500 includes eleven slots, detonated as slots 502*a*, 502*b*, 502*c*, 502*d*, 502*e*, 502*f*, 502*g*, 502*h*, 502*i*, 502*j*, and 502*k* (collectively the slots 502*a*-502*k*). As illustrated in FIG. 5, the configuration 500 describes a feedback method for SPS group common transmission. A UE may receive one or more activation PDCCHs (e.g. such as the activation PDCHHs 206*a*, 206*b* in FIG. 2) by a first PDSCH 504 scheduled by an activation PDCCH 506*b*. In response, some embodiments define a rule that the first activation PDCCH 506*a* received by the UE is the initial activation PDCCH for the UE. The activation PDCCH 506*b* received after the initial activation PDCCH 506*a* is considered as the reactivation PDCCH(s) for the UE. The SPS transmission activated by the activation PDCCH 506*a*, 506*b* includes the same transmission parameters.

The size of the first sub-codebook corresponding to the PDSCHs with scheduling PDCCHs (including dynamic scheduling PDSCHs and SPS PDSCHs scheduled by the activation PDCCHs 506*a* and the reactivation PDCCHs 506*b*) are determined by the DAI value in the scheduling PDCCHs. Additionally, the size of the second sub-codebook corresponding to SPS PDSCHs are determined by both of the SPS PDSCHs scheduled by the reactivation PDCCHs and SPS PDSCHs without scheduling PDCCHs.

Similar as the scenario illustrated in FIG. 3, for example, includes four PDSCHs (e.g., the first PDSCH 306, the second PDSCH 308, the third PDSCH 310, and the fourth PDSCH 312) that feedback on the HARQ-ACK feedback resource 314. There are four PDSCHs in FIG. 5 that feedback on HARQ-ACK feedback resource 514, including 'SPS PDSCH scheduled by activation PDCCH' (e.g., a second PDSCH 508), SPS PDSCH scheduled by reactivation PDCCH' (e.g., the first PDSCH 504), and 'dynamic scheduling PDSCHs' (e.g., a third PDSCH 510 and a fourth PDSCH 512). The feedback information for PDSCH 510, PDSCH 508, PDSCH 504 and PDSCH 512 form the first sub-codebook. For 'SPS PDSCH scheduled by reactivation PDCCH' (e.g., the first PDSCH 504) the feedback information is also transmitted in the second sub-codebook.

Table 20 below describes the detail mapping between the feedback bits in HARQ-ACK feedback codebook transmitted on a HARQ-ACK feedback resource 514 in slot 502*j* and the PDSCHs. The feedback bits, in turn, in the HARQ-ACK feedback codebook correspond to the third PDSCH 510, the second PDSCH 508, the first PDSCH 504, fourth PDSCH 512, and the first PDSCH 504. The DAI values of the PDCCHs for scheduling the third PDSCH 510, the second PDSCH 508, the first PDSCH 504, and the fourth PDSCH 512 are continuous.

In some embodiments, when the UE does not receive the reactivation PDCCH 506*b* for scheduling the first PDSCH 504, the UE is unaware which PDSCH a third bit of the HARQ-ACK feedback codebook 514 corresponds to. In these embodiments, the UE sets the third bit to be 'NACK.' In this scenario, the feedback information of the third bit and a fifth bit of the HARQ-ACK feedback codebook 514 may have different values. For example, the fifth bit is set to Acknowledgment (ACK) as the UE has received the first PDSCH 504 successfully. The gNB ignores the value of the third bit set to 'NACK.'

TABLE 20

| Bit in HARQ-ACK feedback codebook 514 | Corresponding PDSCH |
| --- | --- |
| First bit | Third PDSCH 510 |
| Second bit | Second PDSCH 508 |
| Third bit | First PDSCH 504 |
| Fourth bit | Fourth PDSCH 512 |
| Fifth bit | First PDSCH 504 |

A UE may not receive the activation PDCCH 506*a* as it joins the UE group after the activation PDCCH 506*a* transmitted in slot 502*a*. In this situation, the activation PDCCH 506*b* will be an activation PDCCH, but not be a reactivation PDCCH for this UE. Accordingly, for 'SPS PDSCH scheduled by activation PDCCH' (i.e., the first PDSCH 504 and the second PDSCH 508) and for 'dynamic scheduling PDSCHs' (i.e., the third PDSCH 510 and the fourth PDSCH 512), the feedback information forms the first sub-codebook. Accordingly, there are no feedback bits in the second sub-codebook.

Table 21 describes the detail mapping between the feedback bits in the codebook and the PDSCHs. The feedback bits in the feedback codebook correspond, in turn, to the third PDSCH 510, the second PDSCH 508, the first PDSCH 504, and the fourth PDSCH 512. The DAI values of the PDCCHs for scheduling the third PDSCH 510, the second PDSCH 508, the first PDSCH 504, and the fourth PDSCH 512 are continuous.

TABLE 21

| Bit in HARQ-ACK feedback codebook | Corresponding PDSCH |
|---|---|
| First bit | Third PDSCH 510 |
| Second bit | Second PDSCH 508 |
| Third bit | First PDSCH 504 |
| Fourth bit | Fourth PDSCH 512 |

By defining the rule for configuration 500 for feedback for SPS GC transmission, ambiguity between gNB and UE on determine the HARQ-ACK feedback codebook for SPS group common transmission with the reactivation PDCCH is avoided.

Figure 6:
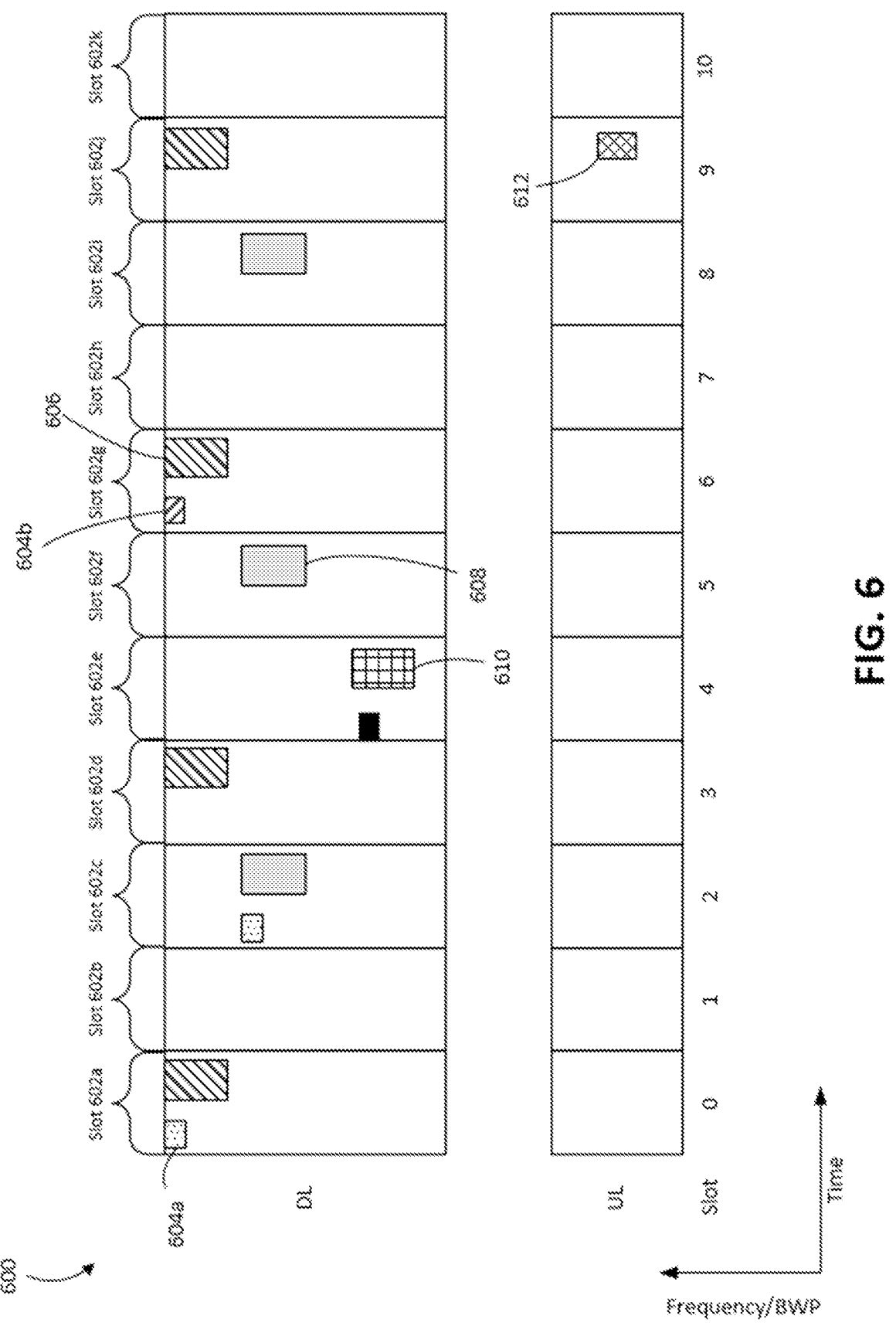
FIG. 6 is a schematic diagram of a sixth design of a transmission mode, according to various embodiments.

FIG. 6 is a diagram illustrating a transmission mode corresponding to an example configuration 600, according to various embodiments. In FIG. 6, the x-axis corresponds to time, and the y-axis corresponds to frequency (e.g., carrier or BWP). The configuration 600 includes eleven slots, detonated as slots 602a, 602b, 602c, 602d, 602e, 602f, 602g, 602h, 602i, 602j, and 602k (collectively the slots 602a-602k). As illustrated in FIG. 6, the configuration 600 describes a feedback method for SPS GC transmission according to another embodiment.

Configuration 600 is applicable in situations where a reactivation PDCCH is the last PDCCH corresponding to a feedback codebook. Configuration 600 may be applicable to the embodiments detailing the various feedback methods described in detail above. For example, a feedback bit for a PDSCH scheduled by the reactivation PDCCH is in a second sub-codebook (e.g., SPS sub-codebook) only.

As illustrated in FIG. 6, a UE may receive both an activation PDCCH 604a disposed in slot 602a and another activation PDCCH 604b disposed in slot 602g. In response, the activation PDCCH 604b becomes the reactivation PDCCH, according to pre-defined rules. Configuration 600 includes a first PDSCH 606, a second PDSCH 608, and a third PDSCH 610 corresponding to a HARQ-ACK feedback codebook transmitted on HARQ-ACK feedback resource 612 disposed in slot 602j.

The first PDSCH 606 scheduled by the reactivation PDCCH is fed back as a 'SPS PDSCH without scheduling PDCCH' since the reactivation PDCCH is the last PDCCH for the HARQ-ACK feedback codebook. Accordingly, the HARQ-ACK feedback bit for first PDSCH 606 is in the second sub-codebook only. In this scenario, the first sub-codebook contains feedback bits corresponding to the dynamic scheduling PDSCHs and PDSCHs scheduling by activation PDCCHs. The feedback bits for the different SPS PDSCHs with different SPS index in the HARQ-ACK feedback codebook are sorted from low to high according to an SPS index. For example, the first PDSCH 606 may be a PDSCH of SPS #2 and the second PDSCH 608 is a PDSCH of SPS #1. Accordingly, the feedback bit for the second PDSCH 608 is disposed before the feedback bit to the first PDSCH 606.

The feedback bits in the HARQ-ACK feedback codebook correspond, in turn, to the third PDSCH 610, second PDSCH 608, and the first PDSCH 606. The DAI values of the PDCCHs for scheduling third PDSCH 610 and the first PDSCH 606 are continuous. In some embodiments, the UE ignores the DAI value in the reactivation PDCCH, in response to the reactivation PDCCH being the last PDCCH corresponding to the HARQ-ACK feedback codebook.

In some embodiments, there may be more than one (e.g., N) reactivation PDCCHs for the last N PDCCHs corresponding to a codebook. The feedback bits for the PDSCHs scheduled by these N reactivation PDCCHs are in the SPS sub-codebook. In other words, for a feedback codebook where there aren't any non-reactivation PDCCHs located behind a reactivation PDCCH, the feedback bit corresponding to the PDSCH scheduled by the reactivation PDCCH is disposed in the second sub-codebook (e.g., SPS sub-codebook).

Figure 7:
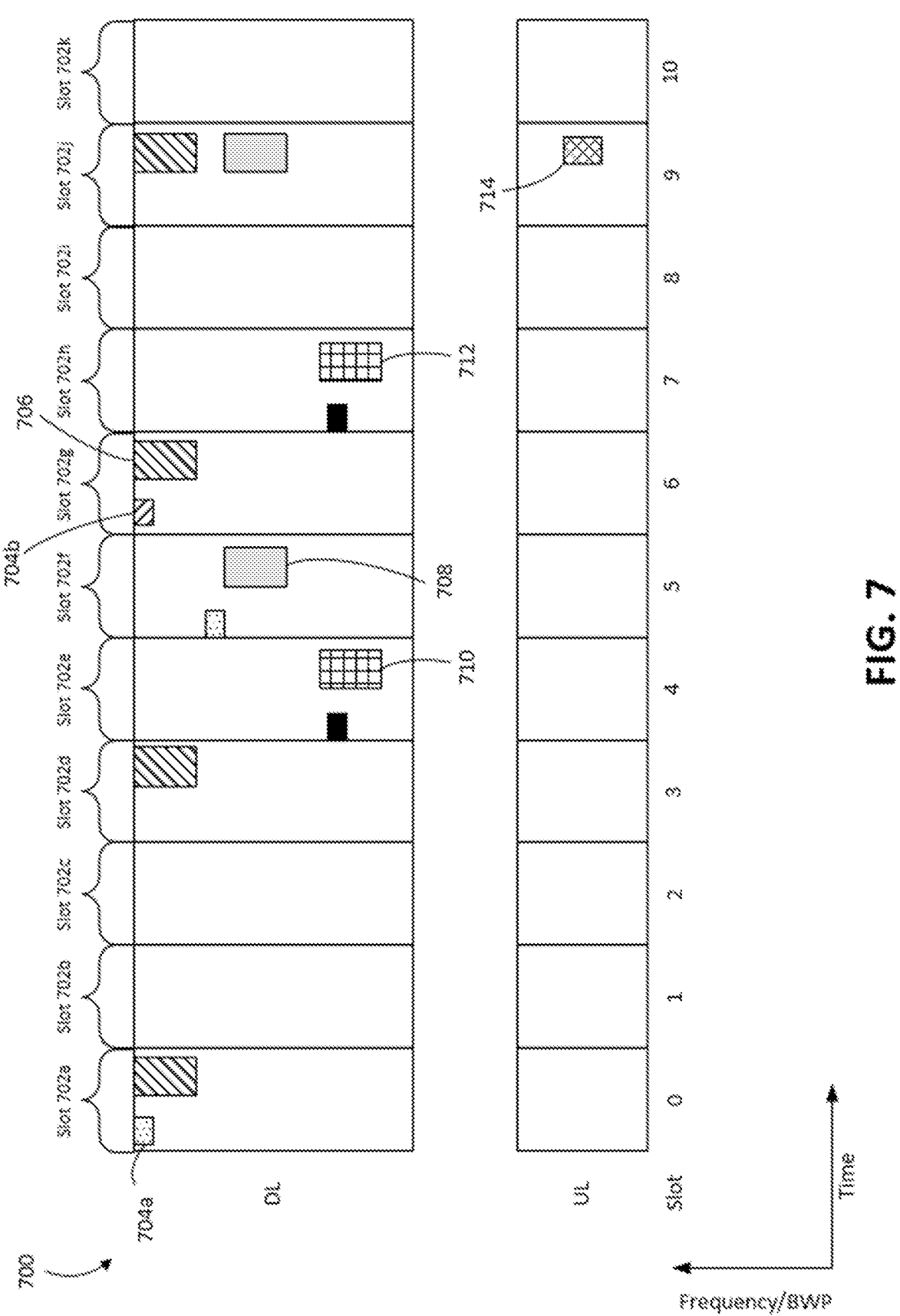
FIG. 7 is a schematic diagram of a seventh design of a transmission mode, according to various embodiments.

FIG. 7 is a diagram illustrating a transmission mode corresponding to an example configuration 700, according to various embodiments. In FIG. 7, the x-axis corresponds to time, and the y-axis corresponds to frequency (e.g., carrier or BWP). The configuration 700 includes eleven slots, detonated as slots 702a, 702b, 702c, 702d, 702e, 702f, 702g, 702h, 702i, 702j, and 702k (collectively the slots 702a-702k). As illustrated in FIG. 7, the configuration 700 describes another embodiment of a feedback method for SPS group common transmission.

Configuration 700 is applicable in situations where a reactivation PDCCH is disposed in front of at least one non-reactivation PDDCH, a feedback bit for the PDSCH scheduled by the reactivation PDCCH is located in both the first sub-codebook (Dynamic scheduling sub-codebook or Dynamic grant (DG) sub-codebook) and the second sub-codebook (SPS sub-codebook). In this scenario, the reactivation PDCCH and the non-reactivation PDCCH correspond to a same feedback codebook. Configuration 700 may be applicable to the embodiments detailing the various feedback methods described in detail above. For example, a UE may receive both a first activation PDCCH 704a and a second activation PDCCH 704b, and the second activation PDCCH 704b becomes a reactivation PDCCH according to pre-defined rules.

The configuration 700 includes a first PDSCH 706, a second PDSCH 708, a third PDSCH 710, and a fourth PDSCH 712 corresponding to a HARQ-ACK feedback codebook transmitted on a HARQ-ACK feedback resource 714 disposed in slot 702j. The first PDSCH 706 is scheduled by the reactivation PDCCH 604b. And the HARQ-ACK feedback bit for the first PDSCH 706 is both in a first sub-codebook and a second sub-codebook. The second PDSCH 708 scheduled by the activation PDCCH has a feedback bit only in the first sub-codebook. The third PDSCH 710 and fourth PDSCH 712 are scheduled by their respective PDCCHs. The third PDSCH 710 and fourth PDSCH 712 are feedback bit is also in the first sub-codebook only.

There are five (5) bits in a feedback codebook in total. The feedback bits correspond to, in turn, the third PDSCH 710, the second PDSCH 708, the first PDSCH 706, the fourth PDSCH 712, and the first PDSCH 706. The DAI values of PDCCHs for scheduling the third PDSCH 710, the second PDSCH 708, the first PDSCH 706, and the fourth PDSCH 712 are continuous.

In some embodiments, in response to the UE not receiving the reactivation PDCCH for scheduling the first PDSCH 706, the UE is unaware which PDSCH the third bit corresponds to. The UE then sets the third bit to 'NACK.' In this scenario, the feedback information of the third bit and the fifth bit may have different values. For example, the fifth bit may be set to 'ACK' since the UE received PDSCH1 successfully. The gNB then ignores the value of the third bit set to 'NACK.'

Figure 8:
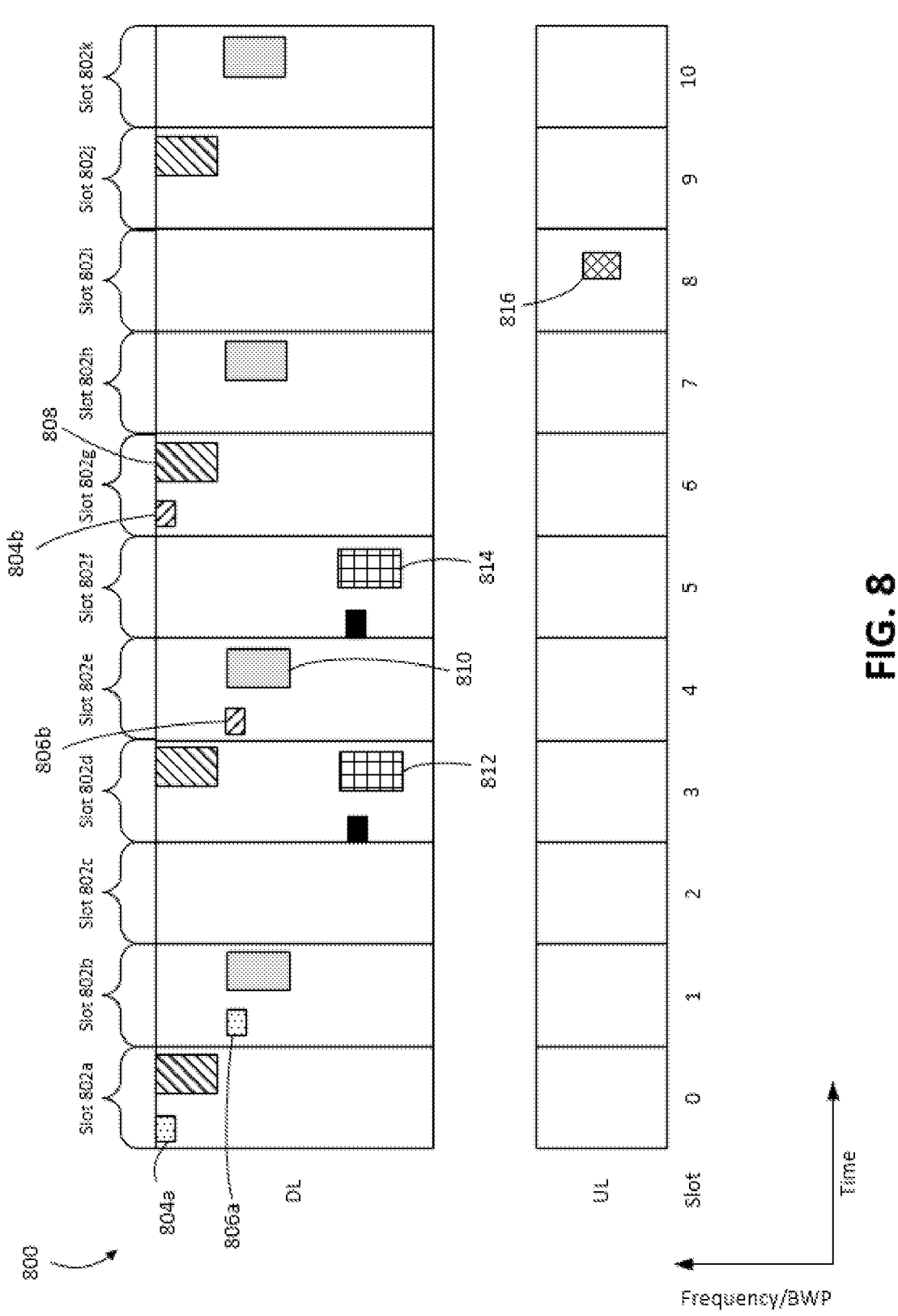
FIG. 8 is a schematic diagram of a seventh design of a transmission mode, according to various embodiments.

FIG. 8 is a diagram illustrating a transmission mode corresponding to an example configuration 800, according to various embodiments. In FIG. 8, the x-axis corresponds to time, and the y-axis corresponds to frequency (e.g., carrier or BWP). The configuration 800 includes eleven slots, detonated as slots 802*a*, 802*b*, 802*c*, 802*d*, 802*e*, 802*f*, 802*g*, 802*h*, 802*i*, 802*j*, and 802*k* (collectively the slots 802*a*-802*k*).

As illustrated in FIG. 8, the configuration 800 describes another embodiment of a feedback method for SPS group common transmission. In one embodiment, the configuration 800 is applicable in situations where the reactivation PDCCH is the last PDCCH corresponding to a feedback codebook. Accordingly, the feedback bit for the PDSCH scheduled by the reactivation PDCCH is in the second sub-codebook (e.g., the SPS sub-codebook) only. In another embodiment, the configuration 800 is applicable in situations where the reactivation PDCCH is located in front of at least one non-reactivation PDCCH. Accordingly, the feedback bit for the PDSCH scheduled by the reactivation PDCCH is located in both the first sub-codebook (DG sub-codebook) and the second sub-codebook (SPS sub-codebook). In this scenario, the reactivation and non-reactivation PDCCH correspond to a same feedback codebook. The configuration 800 may be applicable to the embodiments detailing the various feedback methods described in detail above.

As illustrated in FIG. 8, there may be at least two SPS configurations. A UE receiving both an activation PDCCH 804*a* disposed in slot 802*a* and an activation PDCCH 804*b* disposed in slot 802*g* for SPS #2. SPS #1 includes an activation PDCCH 806*a* disposed in slot 802*b* and an activation PDCCH 806*b* disposed in slot 802*e*. The activation PDCCH 804*b* and 806*b* may become reactivation PDCCHs according to pre-defined rules. The configuration 800 includes a first PDSCH 808, a second PDSCH 810, a third PDSCH 812, and a fourth PDSCH 814 corresponding to a HARQ-ACK feedback codebook transmitted on a HARQ-ACK feedback resource 816 disposed in slot 802*i*.

The first PDSCH 808 scheduled by a reactivation PDCCH is fed back as a 'SPS PDSCH without scheduling PDCCH' as the reactivation PDCCH is the last PDCCH for the HARQ-ACK feedback codebook. In other words, the HARQ-ACK feedback bit for the first PDSCH 808 is in the second sub-codebook after the first sub-codebook, where the first sub-codebook contains feedback bits corresponding to dynamic scheduling PDSCHs. The HARQ-ACK feedback bit for the second PDSCH 810 is in both the first sub-codebook and the second sub-codebook.

The feedback bits for the different SPS in the second sub-codebooks are sorted from low to high according to an SPS index. For example, the first PDSCH 808 may be a PDSCH of SPS #2, while the second PDSCH 810 is a PDSCH of SPS #1. Accordingly, the feedback bit to the second PDSCH 810 is in front of the feedback bit for the first PDSCH 808 in the second sub-codebook. The third PDSCH 812 and the fourth PDSCH 814 are scheduled by their respective PDCCHs and their feedback bits are only in the first sub-codebook.

Feedback bits in the feedback codebook, in turn, correspond to the third PDSCH 812, the second PDSCH 810, the fourth PDSCH 814, the second PDSCH 810, and the first PDSCH 808. The DAI values of the PDCCHs for scheduling the third PDSCH 812, the second PDSCH 810, the fourth PDSCH 814, and the first PDSCH 808 are continuous. In some embodiments, the UE ignores the DAI value in the reactivation PDCCH if the reactivation PDCCH is the last PDCCH corresponding a feedback codebook.

In some embodiments, there may be more than one (e.g., N) reactivation PDCCHs for the last N PDCCHs corresponding to a codebook. The feedback bits for PDSCHs scheduled by these N reactivation PDCCHs are in SPS sub-codebook. In other words, for a feedback codebook, where there aren't any non-reactivation PDCCHs located behind a reactivation PDCCH, the feedback bit corresponding to the PDSCH scheduled by the reactivation PDCCH is in the second sub-codebook (e.g., SPS sub-codebook) only.

In some embodiments, when the UE does not receive the reactivation PDCCH for scheduling the second PDSCH 810, the UE is unaware which PDSCH the second bit corresponds with. In this scenario, the second bit is set to 'NACK.' In this scenario, the feedback information of the second bit and the fourth bit may have different values. For example, the fourth bit is set to 'ACK' since the UE has received the first PDSCH 808 successfully. The gNB then ignores the value of the second bit with 'NACK.'

In some embodiment, the introduction of CG-PUSCH (uplink transmission with configured grant) of URLLC (Ultra-reliable low-latency communication) technology in NR-U (New Radio-Unlicensed) has been established in 3GPP. From the perspective of standard formulation and technology development, the NR-U system is committed to researching higher rates (Gbps), huge links (1 M/Km2), ultra-low latency (1 ms), higher reliability, and technical indicators such as energy efficiency improvement to support new demand changes.

About harmonization of CG-DFI (Configured grant-downlink feedback information) and CG-UCI (Configured grant-uplink control Information) features for unlicensed, there are some options achieved as listed below:

Option 1: Both "CG-UCI based procedures" and "CG-DFI based procedures" are enabled or disabled for unlicensed using one RRC parameter i.e. cg-Retransmission-Timer-r16.

Option 2: "CG-UCI based procedures" and "CG-DFI based procedures" are independently enabled or disabled for unlicensed using respective RRC parameter, i.e. new parameter X and cg-RetransmissionTimer-r16, respectively.

We list all the feature combinations for harmonization of CG-PUSCH features for Rel-16 URLLC and Rel-16 NR-U based on Option 1 and Option 2 as shown in Table 22. Note: 0 means the feature is disabled/not configured, 1 means enabled/configured.

TABLE 22

| Combination cases | Applicable options | CG-UCI | CG-DFI | cg-Retransmission-Timer-r16 |
|---|---|---|---|---|
| Case#1 | Option 1 and Opt 2 | 0 | 0 | 0 |
| Case#2 | Opt 2 | 0 | 1 | 1 |
| Case#3 | Opt 2 | 1 | 0 | 0 |
| Case#4 | Option 1 and Opt 2 | 1 | 1 | 1 |

How to harmonize CG-UCI and CG-DFI, there are two methods:

Method 1: Use Case #1, Case #3 and Case #4 to determine.

If RRC parameter cg-RetransmissionTimer-r16 is configured, "CG-DFI based procedures" is enabled, and "CG-UCI based procedures" must be enabled too;

If RRC parameter cg-RetransmissionTimer-r16 is not configured, "CG-DFI based procedures" is disabled, and "CG-UCI based procedures" can be enabled or disabled.

Further, "CG-UCI based procedures" is enabled or disabled using new RRC parameter X.

Method 2: Use Case #1, Case #2 and Case #4 to determine.

If RRC parameter cg-RetransmissionTimer-r16 is configured, "CG-DFI based procedures" is enabled, and "CG-UCI based procedures" can be enabled or disabled;

If RRC parameter cg-RetransmissionTimer-r16 is not configured, "CG-DFI based procedures" is disabled, and "CG-UCI based procedures" must be disabled too.

Further, "CG-UCI based procedures" is enabled or disabled using new parameter X.

FIG. 9A is a flowchart diagram illustrating an example wireless communication method 900a, according to various arrangements. Method 900a can be performed by a UE (e.g., a wireless communication device). Method 900a begins at 910 where the UE receives, from a Base Station, two or more downlink control resources corresponding to a same SPS transmission for multicast servicers. The two or more downlink control resources include a first downlink control resource corresponding to a first downlink resource. The second downlink control resource corresponds to a second downlink resource. At 910, in response to receiving two or more downlink control resources, the wireless communication device determines at least one of a first sub-codebook or a second sub-codebook. This determination is based on at least one of first feedback information corresponding to the first downlink resource or the second feedback information corresponding to the second downlink resource.

In some embodiments of method 900a, each of the downlink control resources includes an activation PDCCH. The first downlink resource includes a first PDSCH and the second downlink resource includes a second PDSCH. The first feedback information includes at least one first HARQ-ACK feedback bit. The second feedback information includes at least one second HARQ-ACK feedback bit.

In some embodiments of method 900a, the two or more downlink control resources correspond to the same SPS transmission for multicast services. The two or more downlink control resources having at least one of the same (1) a HAQ Process Number (HPN) Value, (2) RNTI for scrambling, and (3) a DCI format. At least a part of the information fields of the DCI are carried on the two or more downlink control resources.

In some embodiments of method 900a, further includes the wireless communication device transmitting a codebook comprising at least one of the first sub-codebook and the second sub-codebook to the base station.

In some embodiments of method 900a, the wireless communication device determines the at least one of the first sub-codebook and the second sub-codebook is based on the first feedback information and the second feedback information by forming the first sub-codebook by using at least one of the first feedback information or a third feedback information. The third feedback information corresponding to a third downlink resourced scheduled using dynamic scheduling.

In some embodiments of method 900a, the wireless communication device further determines the second feedback information by forming the second sub-codebook at least by using one of the second feedback information and a fourth feedback information. The fourth feedback information corresponds to a fourth downlink resource without using dynamic scheduling. The wireless communication device further determines the second feedback information by adding the second sub-codebook after the first sub-codebook.

In some embodiments of method 900a, the first feedback information includes at least one first feedback bit. The second feedback information includes at least one second feedback bit. The third feedback information includes at least one third feedback bit. The fourth feedback information includes at least one fourth feedback bit. The method 900a also includes adding the second sub-codebook after the first sub-codebook includes adding at least one bit of the second feedback information or the fourth feedback information after at least one bit of the first feedback information or the third feedback information.

In some embodiments of method 900a, the determination of the at least one of the first sub-codebook and the second sub-codebook based on by at least one of the first feedback information and the second feedback information includes forming the first sub-codebook using third feedback information and forming the second sub-codebook using at least one of the first feedback information, the second feedback information, or the fourth feedback information. The third feedback information corresponds to the third downlink resource scheduled using dynamic scheduling. The fourth feedback information corresponds to the fourth downlink resource without using the dynamic scheduling and adding the second sub-codebook after the first sub-codebook.

In some embodiments of method 900a, the first feedback information includes at least one first feedback bit. The second feedback information includes at least one second feedback bit. The third feedback information includes at least one third feedback bit. The fourth feedback information includes at least one fourth feedback bit. Adding the second sub-codebook after the first sub-codebook includes adding the at least one bit of the first feedback information, the second feedback information, or the fourth feedback information after the at least one bit of the third feedback information.

In some embodiments of method 900a, determining the at least one of the first sub-codebook and the second sub-codebook based on the first feedback information and the second feedback information includes forming the first sub-codebook using at least one of the first feedback information, the second feedback information, or third feedback information and forming the second sub-codebook using at least one of the first feedback information, the second feedback information, or fourth feedback information. The third feedback information corresponds to the third downlink resource scheduled using dynamic scheduling and the fourth feedback information corresponds to fourth downlink resource without using the dynamic scheduling.

In some embodiments of method 900a, determining the at least one of the first sub-codebook and the second sub-codebook based on the first feedback information and the second feedback information includes forming the first sub-codebook using at least one of the first feedback information, the second feedback information, or third feedback information and forming the second sub-codebook using at least one of the second feedback information or fourth feedback information. The third feedback information corresponds to a third downlink resource scheduled using dynamic scheduling. The fourth feedback information corresponds to a fourth downlink resource without using the dynamic scheduling.

In some embodiments of method 900a, determining the at least one of the first sub-codebook or the second sub-codebook based on the first feedback information and the second feedback information includes, forming the first sub-codebook using at least one of the first feedback information or third feedback information and forming the second sub-codebook using at least one of the second feedback information or the fourth feedback information. The third feedback information corresponds to the third downlink resource scheduled using dynamic scheduling. The fourth feedback information corresponds to the fourth downlink resource without using the dynamic scheduling.

In some embodiments of method 900a, determining the at least one of the first sub-codebook or the second sub-codebook based on the first feedback information and the second feedback information includes, in response of determining the second downlink control resource is before at least one downlink control resource that is not a second downlink control resource, forming the first sub-codebook using at least one of the first feedback information, the second feedback information, or third feedback information and forming the second sub-codebook using at least one of the second feedback information or fourth feedback information. The third feedback information corresponds to the third downlink resource scheduled using dynamic scheduling. The fourth feedback information corresponds to the fourth downlink resource without using the dynamic scheduling.

In some embodiments of method 900a, a wireless communication including at least one processor and a memory. The at least one processor is configured to read code from the memory and implement the method 900a.

In some embodiments of method 900a, a computer program product includes a computer-readable program medium code stored thereupon. The code, when executed by at least one processor, causes the at least one processor to implement the method 900a.

FIG. 9B is a flowchart diagram illustrating an example wireless communication method 900b, according to various arrangements. Method 900b can be performed by a Broadcast Service (BS). Method 900b begins at 930 where the BS transmits, to a plurality of wireless communication devices including a wireless communication device, two or more downlink control resources corresponding to a same SPS transmission for multicast services. The two or more downlink control resources include a first downlink control resource corresponding to a first downlink resource and a second downlink control resource corresponding to a second downlink resource. At 940, method 900b receives by the base station from the wireless communication device, a codebook including at least one of a first sub-codebook or a second sub-codebook. At least one of the first sub-codebook or the second sub-codebook is determined based on at least one of first feedback information corresponding to the first downlink resource or second feedback information corresponding to the second downlink resource.

In some embodiments of method 900b, each of the downlink control resources includes an activation Physical Downlink Control Channel (PDCCH). The first downlink resource includes a first PDSCH. The second downlink resource includes a second PDSCH. The first feedback information includes at least one first HARQ ACK feedback bit. The second feedback information comprises at least one second HARQ ACK feedback bit.

In some embodiments of method 900b, the two or more downlink control resources correspond to the same SPS transmission for multicast services. The two or more downlink control resources having at least one of the same (1) a HAQ Process Number (HPN) Value, (2) RNTI for scrambling, and (3) a DCI format. At least a part of the information fields of the DCI are carried on the two or more downlink control resources.

In some embodiments of method 900b, the first sub-codebook is formed using at least one of the first feedback information or the third feedback information. The third feedback information corresponds to the third downlink resource scheduled using dynamic scheduling.

In some embodiments of method 900b, the second sub-codebook is formed using at least one of the second feedback information or the fourth feedback information. The fourth feedback information corresponds to a fourth downlink resource without using dynamic scheduling. The second sub-codebook is added after the third sub-codebook.

In some embodiments of method 900b, the first sub-codebook is formed using at least one of the third feedback information. The third feedback information corresponds to the third downlink resource scheduled using dynamic scheduling. The second sub-codebook is formed using at least one of the first feedback information, the second feedback information, or the fourth feedback information. The fourth feedback information corresponds to a fourth downlink resource without using the dynamic scheduling. The second sub-codebook is added after the first sub-codebook.

In some embodiments of method 900b, the first sub-codebook is formed using at least one of the first feedback information, the second feedback information, or the third feedback information. The third feedback information corresponds to the third downlink resource scheduled using dynamic scheduling. The second sub-codebook is formed using at least one of the first feedback information, the second feedback information, or the fourth feedback information. The fourth feedback information corresponds to fourth downlink resource without using the dynamic scheduling.

In some embodiments of method 900b, the first sub-codebook is formed using at least one of the first feedback information, the second feedback information, or the third feedback information. The third feedback information corresponds to a third downlink resource scheduled using dynamic scheduling. The second sub-codebook is formed using at least one of the second feedback information or the fourth feedback information. The fourth feedback information corresponds to a fourth downlink resource without using the dynamic scheduling.

In some embodiments of method 900b, a wireless communication apparatus includes at least one processor and a memory. The at least one processor is configured to read code from the memory and implement the method 900b.

In some embodiments of method 900b, a computer program product includes a computer-readable program medium code stored thereupon. The code, when executed by at least one processor, causes the at least one processor to implement the method 900b.

Figure 10B:
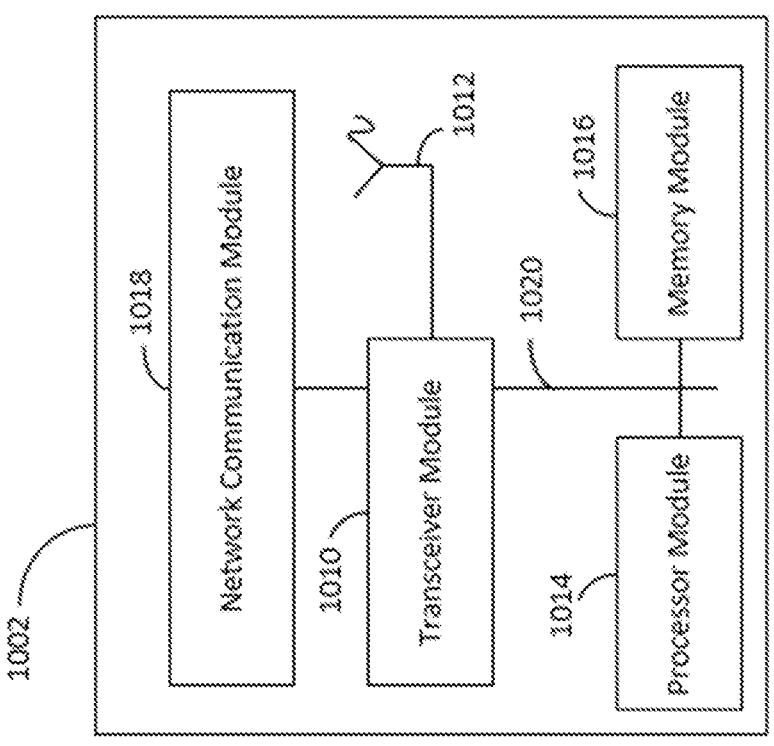
FIG. 10B illustrates a block diagram of an example base station, according to various embodiments.
Figure 10A:
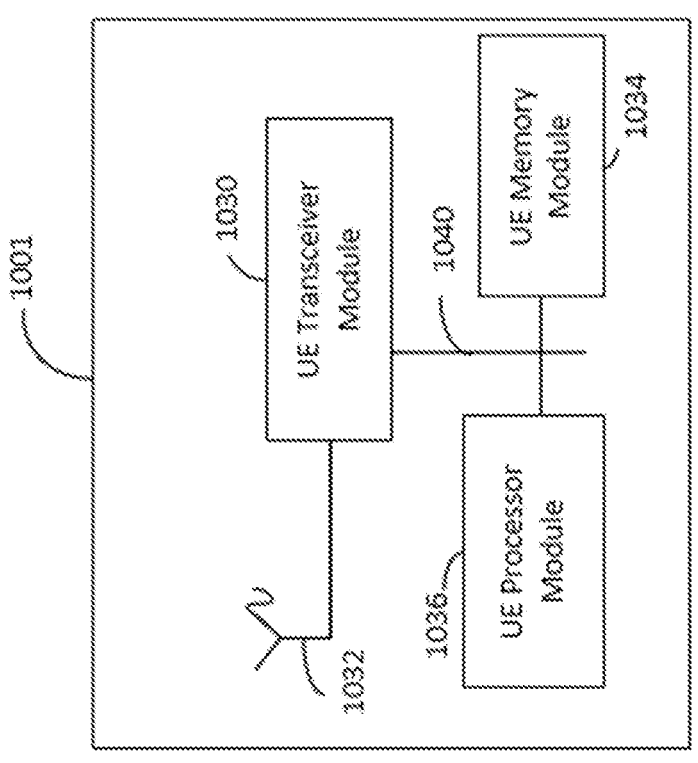
FIG. 10A illustrates a block diagram of an example user equipment, according to various embodiments.

FIG. 10A illustrates a block diagram of an example UE 1001, in accordance with some embodiments of the present disclosure. FIG. 10B illustrates a block diagram of an example BS 1002, in accordance with some embodiments of the present disclosure. The UE 1001 (e.g., a wireless communication device, a terminal, a mobile device, a mobile user, and so on) is an example implementation of the UEs described herein, and the BS 1002 is an example implementation of the BS described herein.

The BS 1002 and the UE 1001 can include components and elements configured to support known or conventional operating features that need not be described in detail herein. In one illustrative embodiment, the BS 1002 and the UE 1001 can be used to communicate (e.g., transmit and receive) data symbols in a wireless communication environment, as described above. For instance, the BS 1002 can be a BS (e.g., gNB, eNB, and so on), a server, a node, or any suitable computing device used to implement various network functions.

The BS 1002 includes a transceiver module 1010, an antenna 1012, a processor module 1014, a memory module 1016, and a network communication module 1018. The modules 1010, 1012, 1014, 1016, and 1018 are operatively coupled to and interconnected with one another via a data communication bus 1020. The UE 1001 includes a UE transceiver module 1030, a UE antenna 1032, a UE memory module 1034, and a UE processor module 1036. The UE modules 1030, 1032, 1034, and 1036 are operatively coupled to and interconnected with one another via a data communication bus 1040. The BS 1002 communicates with the UE 1001 or another BS via a communication channel, which can be any wireless channel or other medium suitable for transmission of data as described herein.

As would be understood by persons of ordinary skill in the art, the BS 1002 and the UE 1001 can further include any number of modules other than the modules shown in FIGS. 10A and 10B. The various illustrative blocks, modules, circuits, and processing logic described in connection with the embodiments disclosed herein can be implemented in hardware, computer-readable software, firmware, or any practical combination thereof. To illustrate this interchangeability and compatibility of hardware, firmware, and software, various illustrative components, blocks, modules, circuits, and steps are described generally in terms of their functionality. Whether such functionality is implemented as hardware, firmware, or software can depend upon the particular application and design constraints imposed on the overall system. The embodiments described herein can be implemented in a suitable manner for each particular application, but any implementation decisions should not be interpreted as limiting the scope of the present disclosure.

In accordance with some embodiments, the UE transceiver module 1030 includes a radio frequency (RF) transmitter and a RF receiver each including circuitry that is coupled to the UE antenna 1032. A duplex switch (not shown) may alternatively couple the RF transmitter or receiver to the antenna in time duplex fashion. Similarly, in accordance with some embodiments, the transceiver module 1010 includes an RF transmitter and a RF receiver each having circuitry that is coupled to the antenna 1012 or the antenna of another BS. A duplex switch may alternatively couple the RF transmitter or receiver to the antenna 1012 in time duplex fashion. The operations of the two-transceiver modules 1010 and 1030 can be coordinated in time such that the receiver circuitry is coupled to the UE antenna 1032 for reception of transmissions over a wireless transmission link at the same time that the transmitter is coupled to the antenna 1012. In some embodiments, there is close time synchronization with a minimal guard time between changes in duplex direction.

The UE transceiver module 1030 and the transceiver module 1010 are configured to communicate via the wireless data communication link, and cooperate with a suitably configured RF antenna arrangement 712/732 that can support a particular wireless communication protocol and modulation scheme. In some illustrative embodiments, the UE transceiver 730 and the transceiver module 1010 are configured to support industry standards such as the Long Term Evolution (LTE) and emerging 5G standards, and the like. It is understood, however, that the present disclosure is not necessarily limited in application to a particular standard and associated protocols. Rather, the UE transceiver module 1030 and the transceiver module 1010 may be configured to support alternate, or additional, wireless data communication protocols, including future standards or variations thereof.

The transceiver module 1010 and the transceiver of another BS (such as but not limited to, the transceiver module 1010) are configured to communicate via a wireless data communication link, and cooperate with a suitably configured RF antenna arrangement that can support a particular wireless communication protocol and modulation scheme. In some illustrative embodiments, the transceiver module 1010 and the transceiver of another BS are configured to support industry standards such as the LTE and emerging 5G standards, and the like. It is understood, however, that the present disclosure is not necessarily limited in application to a particular standard and associated protocols. Rather, the transceiver module 1010 and the transceiver of another BS may be configured to support alternate, or additional, wireless data communication protocols, including future standards or variations thereof.

In accordance with various embodiments, the BS 1002 may be a BS such as but not limited to, an eNB, a serving eNB, a target eNB, a femto station, or a pico station, for example. The BS 1002 can be an RN, a DeNB, or a gNB. In some embodiments, the UE 1001 may be embodied in various types of user devices such as a mobile phone, a smart phone, a personal digital assistant (PDA), tablet, laptop computer, wearable computing device, etc. The processor modules 1014 and 1036 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

Furthermore, the method or algorithm disclosed herein can be embodied directly in hardware, in firmware, in a software module executed by processor modules 1014 and 1036, respectively, or in any practical combination thereof. The memory modules 1016 and 1034 may be realized as RAM memory, flash memory, ROM memory, EPROM memory, EEPROM memory, registers, a hard disk, a removable disk, a CD-ROM, or any other form of storage medium known in the art. In this regard, memory modules 1016 and 1034 may be coupled to the processor modules 1014 and 1036, respectively, such that the processor modules 1014 and 1036 can read information from, and write information to, memory modules 1016 and 1034, respectively. The memory modules 1016 and 1034 may also be integrated into their respective processor modules 1014 and 1036. In some embodiments, the memory modules 1016 and 1034 may each include a cache memory for storing temporary variables or other intermediate information during execution of instructions to be executed by processor modules 1014 and 1036, respectively. Memory modules 1016 and 1034 may also each include non-volatile memory for storing instructions to be executed by the processor modules 1014 and 1036, respectively.

The network communication module 1018 generally represents the hardware, software, firmware, processing logic, and/or other components of the BS 1002 that enable bi-directional communication between the transceiver module 1010 and other network components and communication nodes in communication with the BS 1002. For example, the network communication module 1018 may be configured to support internet or WiMAX traffic. In a deployment, without limitation, the network communication module 1018 provides a 502.3 Ethernet interface such that the transceiver module 1010 can communicate with a conventional Ethernet based computer network. In this manner, the network communication module 1018 may include a physical interface for connection to the computer network (e.g., Mobile Switching Center (MSC)). In some embodiments, the network communication module 718 includes a fiber transport connection configured to connect the BS 1002 to a core network.

The terms "configured for," "configured to" and conjugations thereof, as used herein with respect to a specified operation or function, refer to a device, component, circuit, structure, machine, signal, etc., that is physically constructed, programmed, formatted and/or arranged to perform the specified operation or function.

While various arrangements of the present solution have been described above, it should be understood that they have been presented by way of example only, and not by way of limitation. Likewise, the various diagrams may depict an example architectural or configuration, which are provided to enable persons of ordinary skill in the art to understand example features and functions of the present solution. Such persons would understand, however, that the solution is not restricted to the illustrated example architectures or configurations, but can be implemented using a variety of alternative architectures and configurations. Additionally, as would be understood by persons of ordinary skill in the art, one or more features of one arrangement can be combined with one or more features of another arrangement described herein. Thus, the breadth and scope of the present disclosure should not be limited by any of the above-described illustrative arrangements.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques. To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according arrangements of the present solution.

Additionally, memory or other storage, as well as communication components, may be employed in arrangements of the present solution. It will be appreciated that, for clarity purposes, the above description has described arrangements of the present solution with reference to different functional units and processors. However, it will be apparent that any suitable distribution of functionality between different functional units, processing logic elements or domains may be used without detracting from the present solution. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

The invention claimed is:

1. A wireless communication method comprising, comprising:

receiving, by a wireless communication device from a base station, two or more downlink control resources corresponding to a same Semi-Persistent Scheduling (SPS) transmission for multicast services, wherein the two or more downlink control resources comprise a first downlink control resource corresponding to a first downlink resource and a second downlink control resource corresponding to a second downlink resource; and in response to receiving the two or more downlink control resources, determining, by the wireless communication device, a first sub-codebook and a second sub-codebook based on first feedback information corresponding to the first downlink resource and second feedback information corresponding to the second downlink resource, wherein the first sub-codebook comprises feedback information for downlink resources scheduled using dynamic scheduling, and the second sub-codebook comprises feedback information for downlink resources without using the dynamic scheduling.

2. The method of claim 1, wherein:

each of the downlink control resources comprises an activation Physical Downlink Control Channel (PDCCH);

the first downlink resource comprises a first Physical Downlink Shared Channel (PDSCH);

the second downlink resource comprises a second PDSCH;

the first feedback information comprises at least one first Hybrid Automatic Repeat Request (HARQ) Acknowledgement (ACK) feedback bit; and the second feedback information comprises at least one second HARQ ACK feedback bit.

3. The method of claim 1, wherein:

at least one of following is same for the two or more downlink control resources:

a Hybrid Automatic Repeat Request (HARQ) Process Number (HPN) value;

a Radio Network Temporary Identifier (RNTI) for scrambling;

a Downlink Control Information (DCI) format; or at least a part of information fields of DCIs carried on the two or more downlink control resources.

4. The method of claim 1, further comprising transmitting, by the wireless communication device to the base station, a codebook comprising at least one of the first sub-codebook and the second sub-codebook.

5. The method of claim 1, wherein determining the at least one of the first sub-codebook and the second sub-codebook based on the first feedback information and the second feedback information comprises:

forming the first sub-codebook using at least one of the first feedback information or third feedback information, wherein the third feedback information corresponds to a third downlink resource scheduled using the dynamic scheduling.

6. The method of claim 5, wherein determining the second sub-codebook based on the second feedback information comprises:

forming the second sub-codebook using at least one of the second feedback information or fourth feedback information, wherein the fourth feedback information corresponds to a fourth downlink resource without using the dynamic scheduling; and adding the second sub-codebook after the first sub-codebook.

7. The method of claim 6, wherein the first feedback information comprises at least one first feedback bit;

the second feedback information comprises at least one second feedback bit;

the third feedback information comprises at least one third feedback bit;

the fourth feedback information comprises at least one fourth feedback bit; and adding the second sub-codebook after the first sub-codebook comprises adding the at least one second feedback bit of the second feedback information or the fourth feedback information after the at least one first feedback bit of the first feedback information or the third feedback information.

8. The method of claim 1, wherein determining the at least one of the first sub-codebook and the second sub-codebook based on at least one of the first feedback information and the second feedback information comprises:

forming the first sub-codebook using third feedback information, wherein the third feedback information corresponds to a third downlink resource scheduled using the dynamic scheduling;

forming the second sub-codebook using at least one of the first feedback information, the second feedback information, or fourth feedback information, wherein the fourth feedback information corresponds to fourth downlink resource without using the dynamic scheduling; and adding the second sub-codebook after the first sub-codebook.

9. The method of claim 8, wherein the first feedback information comprises at least one first feedback bit;

the second feedback information comprises at least one second feedback bit;

the third feedback information comprises at least one third feedback bit;

the fourth feedback information comprises at least one fourth feedback bit; and adding the second sub-codebook after the first sub-codebook comprises adding the at least one first feedback bit of the first feedback information, the second feedback information or the fourth feedback information after the at least one third feedback bit of the third feedback information.

10. The method of claim 1, wherein determining the at least one of the first sub-codebook and the second sub-codebook based on the first feedback information and the second feedback information comprises:

forming the first sub-codebook using at least one of the first feedback information, the second feedback information, or third feedback information, wherein the third feedback information corresponds to a third downlink resource scheduled using the dynamic scheduling; and forming the second sub-codebook using at least one of the first feedback information, the second feedback information, or fourth feedback information, wherein the fourth feedback information corresponds to fourth downlink resource without using the dynamic scheduling.

11. The method of claim 1, wherein determining the at least one of the first sub-codebook and the second sub-codebook based on the first feedback information and the second feedback information comprises:

forming the first sub-codebook using at least one of the first feedback information, the second feedback information, or third feedback information, wherein the third feedback information corresponds to a third downlink resource scheduled using the dynamic scheduling; and forming the second sub-codebook using at least one of the second feedback information or fourth feedback information, wherein the fourth feedback information corresponds to a fourth downlink resource without using the dynamic scheduling.

12. The method of claim 1, wherein determining the at least one of the first sub-codebook or the second sub-codebook based on the first feedback information and the second feedback information comprises:

in response of determining the second downlink control resource is a last downlink control resource corresponding to a codebook:

forming the first sub-codebook using at least one of the first feedback information or third feedback information, wherein the third feedback information corresponds to a third downlink resource scheduled using the dynamic scheduling, forming the second sub-codebook using at least one of the second feedback information or fourth feedback information, wherein the fourth feedback information corresponds to fourth downlink resource without using the dynamic scheduling.

13. The method of claim 1, wherein determining the at least one of the first sub-codebook or the second sub-codebook based on the first feedback information and the second feedback information comprises:

in response of determining the second downlink control resource is before at least one downlink control resource that is not the second downlink control resource:

forming the first sub-codebook using at least one of the first feedback information, the second feedback information, or third feedback information, wherein the third feedback information corresponds to a third downlink resource scheduled using the dynamic scheduling; and forming the second sub-codebook using at least one of the second feedback information or fourth feedback information, wherein the fourth feedback information corresponds to fourth downlink resource without using the dynamic scheduling.

14. A wireless communication device, comprising:

at least one processor configured to:

receive, via a receiver from a base station, two or more downlink control resources corresponding to a same Semi-Persistent Scheduling (SPS) transmission for multicast services, wherein the two or more downlink control resources comprise a first downlink control resource corresponding to a first downlink resource and a second downlink control resource corresponding to a second downlink resource; and in response to receiving the two or more downlink control resources, determine a first sub-codebook and a second sub-codebook based on a first feedback information corresponding to the first downlink resource and second feedback information corresponding to the second downlink resource, wherein the first sub-codebook comprises feedback information for downlink resources scheduled using dynamic scheduling, and the second sub-codebook comprises feedback information for downlink resources without using the dynamic scheduling.

15. A wireless communication method, comprising:

transmitting, by a base station to a plurality of wireless communication devices including a wireless communication device, two or more downlink control resources corresponding to a same Semi-Persistent Scheduling (SPS) transmission for multicast services, wherein the two or more downlink control resources comprise a first downlink control resource corresponding to a first downlink resource and a second downlink control resource corresponding to a second downlink resource; and receiving, by the base station from the wireless communication device, a codebook comprising a first sub-codebook and a second sub-codebook, wherein at the first sub-codebook and the second sub-codebook is determined based on a first feedback information corresponding to the first downlink resource and second feedback information corresponding to the second downlink resource, wherein the first sub-codebook comprises feedback information for downlink resources scheduled using dynamic scheduling, and the second sub-codebook comprises feedback information for downlink resources without using the dynamic scheduling.

16. The method of claim 15, wherein each of the downlink control resources comprises an activation Physical Downlink Control Channel (PDCCH);

the first downlink resource comprises a first Physical Downlink Shared Channel (PDSCH);

the second downlink resource comprises a second PDSCH;

the first feedback information comprises at least one first Hybrid Automatic Repeat Request (HARQ) Acknowledgement (ACK) feedback bit; and the second feedback information comprises at least one second HARQ ACK feedback bit.

17. The method of claim 15, wherein the two or more downlink control resources correspond to a same SPS transmission for the multicast services; and at least one of the following is same for the two or more downlink control resources:

a Hybrid Automatic Repeat Request (HARQ) Process Number (HPN) value;

a Radio Network Temporary Identifier (RNTI) for scrambling;

a Downlink Control Information (DCI) format; or at least a part of information fields of DCIs carried on the two or more downlink control resources.

18. The method of claim 15, wherein the first sub-codebook is formed using at least one of the first feedback information or third feedback information, wherein the third feedback information corresponds to a third downlink resource scheduled using the dynamic scheduling.

19. The method of claim 18, wherein:

the second sub-codebook is formed using at least one of the second feedback information or fourth feedback information, wherein the fourth feedback information corresponds to a fourth downlink resource without using the dynamic scheduling; and the second sub-codebook is added after a third sub-codebook.

20. A base station, comprising:

at least one processor configured to:

transmit, via a transceiver to a plurality of wireless communication devices including a wireless communication device, two or more downlink control resources corresponding to a same Semi-Persistent Scheduling (SPS) transmission for multicast services, wherein the two or more downlink control resources comprise a first downlink control resource corresponding to a first downlink resource and a second downlink control resource corresponding to a second downlink resource; and receive, via the transceiver from the wireless communication device, a codebook comprising a first sub-codebook and a second sub-codebook, wherein the first sub-codebook and the second sub-codebook is determined based on a first feedback information corresponding to the first downlink resource and second feedback information corresponding to the second downlink resource, wherein the first sub-codebook comprises feedback information for downlink resources scheduled using dynamic scheduling, and the second sub-codebook comprises feedback information for downlink resources without using the dynamic scheduling.

\* \* \* \* \*